United States Patent
Vinciarelli

(10) Patent No.: US 12,132,403 B1
(45) Date of Patent: Oct. 29, 2024

(54) THREE-PHASE AC TO DC ISOLATED POWER CONVERSION WITH POWER FACTOR CORRECTION

(71) Applicant: Vicor Corporation, Andover, MA (US)

(72) Inventor: Patrizio Vinciarelli, Boston, MA (US)

(73) Assignee: Vicor Corporation, Andover, MA (US)

( * ) Notice: Subject to any disclaimer, the term of this patent is extended or adjusted under 35 U.S.C. 154(b) by 0 days.

(21) Appl. No.: 17/939,820

(22) Filed: Sep. 7, 2022

Related U.S. Application Data

(60) Division of application No. 17/092,062, filed on Nov. 6, 2020, now Pat. No. 11,736,014, which is a division
(Continued)

(51) Int. Cl.
| | |
|---|---|
| H02M 3/00 | (2006.01) |
| H02M 1/42 | (2007.01) |
| H02M 3/158 | (2006.01) |
| H02M 3/335 | (2006.01) |
| H02M 1/00 | (2006.01) |

(52) U.S. Cl.
CPC ....... H02M 3/1584 (2013.01); H02M 1/4241 (2013.01); H02M 3/33523 (2013.01); H02M 3/33569 (2013.01); H02M 1/0003 (2021.05); H02M 1/0058 (2021.05)

(58) Field of Classification Search
CPC ............ H02M 7/00; H02M 7/02; H02M 7/30; H02M 3/1584
See application file for complete search history.

(56) References Cited

U.S. PATENT DOCUMENTS

| | | |
|---|---|---|
| 3,517,300 A | 6/1970 | McMurray |
| 5,442,539 A | 8/1995 | Cuk et al. |

(Continued)

FOREIGN PATENT DOCUMENTS

WO    WO-97/33213 A1    9/1997

OTHER PUBLICATIONS

A. Kumar and K. K. Afridi, "Single-stage isolated 48V-to-1.8V point-of-load converter utilizing an impedance control network for wide input range operation," IEEE Energy Conversion Congress and Exposition (ECCE), Cincinnati, OH, 2017, pp. 2003-2009.
(Continued)

*Primary Examiner* — Adi Amrany
(74) *Attorney, Agent, or Firm* — Foley & Lardner LLP

(57) ABSTRACT

An isolated, power factor corrected, converter, for operation from a three-phase AC source, comprises three power processors, each power processor connected to one of the three phases. Each power processor comprises a cascade of a first and a second power conversion stage. At least one of the first and second power converters in each power processor is configured to provide galvanic isolation through a DC Transformer between the power processor input and output. At least one of the first and second power converters in each power processor is configured to provide power factor correction at the AC source. Substantially all of the bulk energy storage and low frequency filtering is provided by storage elements at the output of the power system. Low voltage semiconductor devices may be cascaded to implement low output capacitance high voltage switches in a multi-cell resonant converter for high voltage applications.

16 Claims, 12 Drawing Sheets

Related U.S. Application Data of application No. 16/282,278, filed on Feb. 21, 2019, now Pat. No. 11,228,246, which is a continuation-in-part of application No. 15/917,538, filed on Mar. 9, 2018, now abandoned.

(56) References Cited

U.S. PATENT DOCUMENTS

| | | | |
|---|---|---|---|
| 6,218,792 B1* | 4/2001 | Berth | B60L 9/28 |
| | | | 105/49 |
| 6,343,021 B1 | 1/2002 | Williamson | |
| 6,788,033 B2 | 9/2004 | Vinciarelli | |
| 6,930,893 B2 | 8/2005 | Vinciarelli | |
| 7,145,786 B2 | 12/2006 | Vinciarelli | |
| 7,154,250 B2 | 12/2006 | Vinciarelli | |
| 7,170,764 B2 | 1/2007 | Vinciarelli | |
| 7,193,866 B1 | 3/2007 | Huang | |
| 7,212,419 B2 | 5/2007 | Vinciarell | |
| 7,408,795 B2 | 8/2008 | Vinciarelli | |
| 7,420,825 B2 | 9/2008 | Vinciarelli | |
| 7,423,892 B2 | 9/2008 | Vinciarelli | |
| 7,499,290 B1 | 3/2009 | Mazzola et al. | |
| 7,548,441 B2 | 6/2009 | Vinciarelli | |
| 7,561,446 B1 | 7/2009 | Vinciarelli | |
| 7,782,639 B2 | 8/2010 | Vinciarelli | |
| 7,920,391 B1 | 4/2011 | Vinciarelli | |
| 7,940,540 B2 | 5/2011 | Vinciarelli | |
| 8,222,772 B1 | 7/2012 | Vinciarelli | |
| 8,581,147 B2 | 11/2013 | Kooken et al. | |
| 8,693,213 B2 | 4/2014 | Jungreis et al. | |
| 9,087,656 B1 | 7/2015 | Vinciarelli | |
| 9,331,579 B2* | 5/2016 | Barbosa | H02M 3/22 |
| 9,413,259 B1 | 8/2016 | Vinciarelli | |
| 9,479,077 B1 | 10/2016 | Kim et al. | |
| 9,490,720 B1 | 11/2016 | Kim et al. | |
| 9,806,617 B1 | 10/2017 | Ozawa et al. | |
| 10,020,752 B1 | 7/2018 | Vinciarelli | |
| 10,374,505 B2 | 8/2019 | Wood | |
| 10,389,166 B1 | 8/2019 | Sahoo et al. | |
| 2003/0007372 A1 | 1/2003 | Porter et al. | |
| 2003/0142513 A1 | 7/2003 | Vinciarelli | |
| 2008/0013343 A1 | 1/2008 | Matthews | |
| 2010/0289453 A1* | 11/2010 | Firehammer | H02J 7/0016 |
| | | | 320/118 |
| 2012/0217938 A1 | 8/2012 | Sagneri et al. | |
| 2012/0224401 A1 | 9/2012 | Phadke | |
| 2013/0127358 A1 | 5/2013 | Yao | |
| 2014/0140104 A1 | 5/2014 | Norrga et al. | |
| 2014/0153294 A1* | 6/2014 | Deboy | H02M 3/33573 |
| | | | 363/21.04 |
| 2015/0029761 A1* | 1/2015 | Trinh | H02M 3/33507 |
| | | | 363/17 |
| 2015/0340860 A1* | 11/2015 | Tenca | H02J 3/36 |
| | | | 307/31 |
| 2016/0043633 A1 | 2/2016 | Phadke | |
| 2016/0065081 A1* | 3/2016 | Raju | H02M 3/33571 |
| | | | 29/602.1 |
| 2016/0072396 A1 | 3/2016 | Deboy et al. | |
| 2016/0261205 A1 | 9/2016 | Kolar et al. | |
| 2017/0019027 A1 | 1/2017 | Knobloch | |
| 2017/0085189 A1* | 3/2017 | Madsen | H02M 1/44 |
| 2018/0156852 A1* | 6/2018 | Xia | G01R 31/64 |
| 2018/0175734 A1 | 6/2018 | Gherghescu et al. | |
| 2018/0254706 A1 | 9/2018 | Cheng et al. | |
| 2019/0052177 A1 | 2/2019 | Lu et al. | |
| 2020/0244175 A1 | 7/2020 | Mahdavikhah-Mehrabad et al. | |
| 2021/0155104 A1 | 5/2021 | Skutt et al. | |

OTHER PUBLICATIONS

C. Fei, M. H. Ahmed, F. C. Lee and Q. Li, "Two-Stage 48 V-12 V/6 V-1.8 V Voltage Regulator Module With Dynamic Bus Voltage Control for Light-Load Efficiency Improvement," IEEE Transactions on Power Electronics, vol. 32, No. 7, pp. 5628-5636, Jul. 2017.

D. M. Giuliano, M. E. D'Asaro, J. Zwart and D. J. Perreault, "Miniaturized Low-Voltage Power Converters With Fast Dynamic Response," IEEE Journal of Emerging and Selected Topics in Power Electronics, vol. 2, No. 3, pp. 395-405, Sep. 2014.

G. S. Seo, R. Das and H. P. Le, "A 95%-Efficient 48V-to-1V/10A VRM Hybrid Converter Using Interleaved Dual Inductors," IEEE Energy Conversion Congress and Exposition (ECCE), Portland, OR, 2018, pp. 3825-3830.

M. Chen, K. K. Afridi, S. Chakraborty and D. J. Perreault, "Multitrack Power Conversion Architecture," IEEE Transactions on Power Electronics, vol. 32, No. 1, pp. 325-340, Jan. 2017.

M. H. Ahmed, C. Fei, F. C. Lee and Q. Li, "48-V Voltage Regulator Module With PCB Winding Matrix Transformer for Future Data Centers," IEEE Transactions on Industrial Electronics, vol. 64, No. 12, pp. 9302-9310, Dec. 2017.

M. H. Ahmed, C. Fei, F. C. Lee and Q. Li, "High-Efficiency High-Power-Density 48/1V Sigma Converter Voltage Regulator Module," IEEE Applied Power Electronics Conference and Exposition (APEC), Tampa, FL, 2017, pp. 2207-2212.

R. C. N. Pilawa-Podgurski, D. M. Giuliano and D. J. Perreault, "Merged two-stage power converter architecture with soft charging switched capacitor energy transfer," IEEE Power Electronics Specialists Conference, Rhodes, 2008.

R. Das and H. P. Le, "A Regulated 48V-to-1V/100A 90.9%-Efficient Hybrid Converter for PoL Applications in Data Centers and Telecommunication Systems," IEEE Applied Power Electronics Conference and Exposition (APEC), Anaheim, CA, 2019, pp. 1997-2001.

S. Jiang, S. Saggini, C. Nan, X. Li, C. Chung and M. Yazdani, "Switched Tank Converters," IEEE Transactions on Power Electronics, vol. 34, No. 6, pp. 5048-5062, Jun. 2019.

S. R. Pasternak, M. H. Kiani, J. S. Rentmeister and J. T. Stauth, "Modeling and Performance Limits of Switched-Capacitor DC-DC Converters Capable of Resonant Operation With a Single Inductor," IEEE Journal of Emerging and Selected Topics in Power Electronics, vol. 5, No. 4, pp. 1746-1760, Dec. 2017.

S. Saggini, O. Zambetti, R. Rizzolatti, M. Picca and P. Mattavelli, "An Isolated Quasi-Resonant Multiphase Single-Stage Topology for 48-V VRM Applications," IEEE Transactions on Power Electronics, vol. 33, No. 7, pp. 6224-6237, Jul. 2018.

W. J. Lambert, M. J. Hill, K. Radhakrishnan, L. Wojewoda and A. E. Augustine, "Package Inductors for Intel Fully Integrated Voltage Regulators," IEEE Transactions on Components, Packaging and Manufacturing Technology, vol. 6, No. 1, pp. 3-11, Jan. 2016.

Y. Cui, F. Yang, L. M. Tolbert, D. J. Costiett, F. Wang and B. J. Blalock, "Load-Dependent Soft-Switching Method of Half-Bridge Current Doubler for High-Voltage Point-of-Load Converter in Data Center Power Supplies," IEEE Transactions on Power Electronics, vol. 32, No. 4, pp. 2925-2938, Apr. 2017.

Y. Li, X. Lyu, D. Cao, S. Jiang and C. Nan, "A 98.55% Efficiency Switched-Tank Converter for Data Center Application," IEEE Transactions on Industry Applications, vol. 54, No. 6, pp. 6205-6222, Jun. 2018.

Bhucaneswari, et al., "Three-Phase Push-Pull Modular Converter Based Welding Power Supply with Improved Power Quality," IEEE, 5 pages (2012).

Kolar, "Tutorial 2 X-treme Efficiency Power Electronics," Swiss Federal Institute of Technology Zurich(ETH), Power Electronic Systems Laboratory www.pes.ee.ethz.ch, Tutorial 2 (2014).

Persson, "Infineon Breaking Boundaries with Infineon's New GaN Solution," Power System Design, retrieved from https://www.powersystemsdesign.com/articles/infineon-breaking-boundaries-with-infineons-new-gan-solution/33/13707, pages (2018).

Ruderman, et al., "Simple Analysis of a Flying Capacitor Converter Voltage Balance Dynamics for DC Modulation," Conference Paper, 9 pages (2008).

Zhang, et al., "Phase-Modular Three-Phase Isolated Bridgeless PFC Converter," IECON2015—Yokohama, pp. 001723-001728 (2015).

* cited by examiner

THREE-PHASE AC TO DC ISOLATED POWER CONVERSION WITH POWER FACTOR CORRECTION

CROSS-REFERENCE TO RELATED APPLICATIONS

This application is a divisional of U.S. patent application Ser. No. 17/092,062 filed Nov. 6, 2020 which is a divisional of U.S. patent application Ser. No. 16/282,278 filed Feb. 21, 2019 (now U.S. Pat. No. 11,228,246) which is a continuation-in-part of U.S. patent application Ser. No. 15/917,538, filed Mar. 9, 2018. The entirety of each of these applications is incorporated by reference herein.

TECHNICAL FIELD

This invention relates to apparatus and methods for deriving isolated DC power from a three-phase AC source while drawing a relatively low reactive current from the AC source (i.e. high power factor operation).

BACKGROUND

Power converters operating from three-phase sources may provide Power Factor Correction ("PFC") and provide galvanic isolation between the source and the load for safety, to increase power transmission efficiency, and satisfy agency regulations.

SUMMARY

An exemplary embodiment is an apparatus for converting power from an AC source, having a source frequency and a source waveform, for delivery to a load. The apparatus includes an AC input for receiving power from the AC source. The apparatus further includes one or more power processors, each power processor having a processor input adapted to receive power via the processor input from the AC source, a first power conversion stage having a first stage input and first switching power conversion circuitry adapted to deliver power to a first stage output, and a second power conversion stage having a second stage input connected to receive power from the first stage output and second switching power conversion circuitry adapted to deliver power via a second stage output to a processor output. The first power conversion stage has an operating frequency that is at least one order of magnitude greater than the source frequency and is adapted to adjust an envelope of current drawn by the first stage input over a selected time interval to approximate the source waveform during said selected time interval. Additionally, the second power conversion stage has an operating frequency that is at least one order of magnitude greater than the source frequency, an essentially fixed voltage transformation ratio, and is adapted to provide galvanic isolation between the second stage input and the second stage output. Each processor output of the one or more power processors is connected to a common output to supply power to the load. The apparatus further includes an energy storage device connected to the common output.

A second exemplary embodiment is an apparatus for converting power from an AC source, having a plurality of phases, a source frequency, and a source waveform, for delivery to a load. The apparatus includes an AC input for receiving power from each of the plurality of phases of the AC source. The apparatus further includes a plurality of power processors, each power processor having a processor input connected to receive power from a respective one of the plurality of phases, a first power conversion stage having a first stage input adapted to receive power from a respective phase of the AC source at a first stage input and a first stage output, galvanically isolated from the first stage input, and connected to supply power at the first stage output, wherein a ratio of a first stage output voltage to a first stage input voltage is essentially fixed, the first power conversion stage being adapted to supply power via the first stage output at a unipolar voltage characterized by a periodic ripple having a characteristic frequency and a characteristic period, and a second power conversion stage having a second stage input connected to receive power from the first stage output for delivery to a common output via a second stage output, the second power conversion stage comprising one or more power switches and a power factor correcting controller adapted to operate the one or more power switches in a series of converter operating cycles each having a duration that is 1% or less of the characteristic period, the second power conversion stage being adapted to adjust an envelope of current drawn by the second power conversion stage to perform power factor correction. The common output combining power is processed by the plurality of power processors from each of the plurality of phases. The apparatus further includes an energy storage device connected to the common output to receive power from each of the plurality of phases. The apparatus may further include an active transient switch controller.

A third exemplary embodiment is an apparatus for converting power from an AC source, having a source frequency and a source waveform, for delivery to a load. The apparatus includes an AC input for receiving power from the AC source. The apparatus further includes a plurality of power processors, each power processor having a processor input adapted to receive power via the processor input from the AC source. A first power conversion stage may have a first stage input and first switching power conversion circuitry adapted to deliver power to a first stage output. A second power conversion stage may have a second stage input connected to receive power from the first stage output and second switching power conversion circuitry adapted to deliver power via a second stage output to a processor output. The first power conversion stage may have an operating frequency that is at least one order of magnitude greater than the source frequency, an essentially fixed voltage transformation ratio, and may be adapted to provide galvanic isolation between the first stage input and the first stage output. The second power conversion stage may have an operating frequency that is at least one order of magnitude greater than the source frequency and may be adapted to adjust an envelope of current drawn by the second stage input over a selected time interval to approximate the source waveform during said selected time interval. Each processor output of the plurality of power processors may be connected to a common output to supply power to the load. The apparatus further includes an energy storage device connected to the common output.

A fourth exemplary embodiment is an apparatus for converting power from an AC source, having a source frequency and a source waveform, for delivery to a load. The apparatus includes a power processor having a processor input adapted to receive power via the processor input from the source. The power processor further may have a first power conversion stage having a first stage input and first switching power conversion circuitry adapted to convert power received from the first stage input at a first stage input voltage, V1in, for delivery to a first stage output at a first stage output voltage, V1out. The first power conversion stage may have an operating frequency that is at least one order of magnitude greater than the source frequency and may be adapted to provide galvanic isolation between the first stage input and the first stage output. The first switching power conversion circuitry may include a number, n, of input cells, each having a cell input for receiving power at a cell input voltage, Vc-in, the input cells being configured in series with each cell input connected in series with the other cell inputs across the first stage input to divide the first stage input voltage, V1in, among the input cells, such that Vc-in=V1-in/n and the number, n, of input cells being greater than 1. Each input cell may include a respective primary winding and a respective one or more primary switches configured to make or break a current path between the primary winding and its respective cell input, the one or more primary switches in each of the input cells including a number, x, of series-connected semiconductor devices, each having a respective control terminal and a maximum device voltage rating, Vdevmax, and the number, x, being greater than 1. The apparatus further includes a switch controller including a drive transformer having a plurality of secondary windings, each secondary winding being connected to operate the control terminal of a respective series-connected semiconductor device. The switch controller may be configured to operate the input cells in a series of converter operating cycles, with an essentially fixed voltage transformation ratio during which the primary switches turn ON and OFF at times when a current flowing through said primary switch is near a minimum and turn ON at times when a voltage across said primary switch is near a minimum. A voltage across the series-connected semiconductor devices within each primary switch are controlled to be substantially equal during the ON to OFF transitions. In some implementations, the product of n and x is greater than 4.

A fifth exemplary embodiment is an apparatus for converting power from a source at a source voltage, Vsrc, for delivery to a load. The apparatus includes a power processor having a processor input adapted to receive power via the processor input from the source and a first power conversion stage having a first stage input. The power processor further includes first switching power conversion circuitry adapted to convert power received from the first stage input at a first stage input voltage, V1in, for delivery to a first stage output at a first stage output voltage, V1out. The first power conversion stage may be adapted to provide galvanic isolation between the first stage input and the first stage output. The first switching power conversion circuitry may include a number, n, of input cells, each having a cell input for receiving power at a cell input voltage, Vc-in, the input cells being configured in series with each cell input connected in series with the other cell inputs across the first stage input to divide the first stage input voltage, V1in, among the input cells, and the number, n, of input cells being greater than 1. Each input cell may include a respective primary winding and a respective one or more primary switches configured to make or break a current path between the primary winding and its respective cell input. The one or more primary switches in each of the input cells may include a number, x, of series-connected semiconductor devices, each having a respective control terminal and a maximum device voltage rating, Vdevmax, and the number, x, being greater than 1. The apparatus further includes a switch controller including a drive transformer having a plurality of secondary windings. Each secondary winding may be connected to operate the control terminal of a respective series-connected semiconductor device. The switch controller may be configured to operate the input cells in a series of converter operating cycles, with an essentially fixed voltage transformation ratio during which the primary switches turn ON and OFF at times when a current flowing through said primary switch is at or near a minimum and turn ON at times when a voltage across said primary switch is at or near a minimum. A voltage across the series-connected semiconductor devices within each primary switch may be controlled to be substantially equal during the ON to OFF transitions. The cell input voltage, Vc-in, may be less than or essentially equal to one half of the first stage input voltage, V1in. The series-connected semiconductor devices in an OFF state may be subjected to a voltage, Vdev, that may be less than one quarter of the input voltage, V1in.

DESCRIPTION OF THE DRAWINGS

Like reference numbers and symbols in the various drawings indicate like elements.

DETAILED DESCRIPTION

Ideally, loads connected to AC power systems, such as the AC mains, would appear purely resistive, i.e. the current drawn by a load would comprise a single, in-phase, sinusoidal component at the fundamental frequency of the sinusoidal AC voltage source and would contain no higher frequency harmonic components. Non-ideal loads, such as inductive, capacitive, and many electronic loads, including typical switching regulators, do not typically appear resistive. Such loads may draw AC currents that lead or lag the voltage or are rich in harmonic content, creating losses in the AC distribution system. In addition to creating losses, flow of reactive current components in a three-phase wye system can cause elevated neutral currents that may cause the current rating of the neutral wiring to be exceeded. Flow of reactive currents in AC distribution system impedances may also cause distortion in the AC voltage delivered to loads. Power Factor Correction ("PFC") refers to techniques used to reduce the reactive currents drawn from an AC source, making a load appear more resistive to the AC source. Published standards, e.g. IEC 1000 3 2 and EN 61000-3-2, set PFC guidelines for acceptable limits for harmonic currents created by equipment that is connected to public AC utility systems with nominal voltages up to 230$V_{rms}$ (single-phase) and 400$V_{rms}$ (three-phase) and for all electrical and electronic equipment with rated currents up to 16 Amperes. The published guidelines apply to the 2nd through the 40th harmonics.

Figure 1:
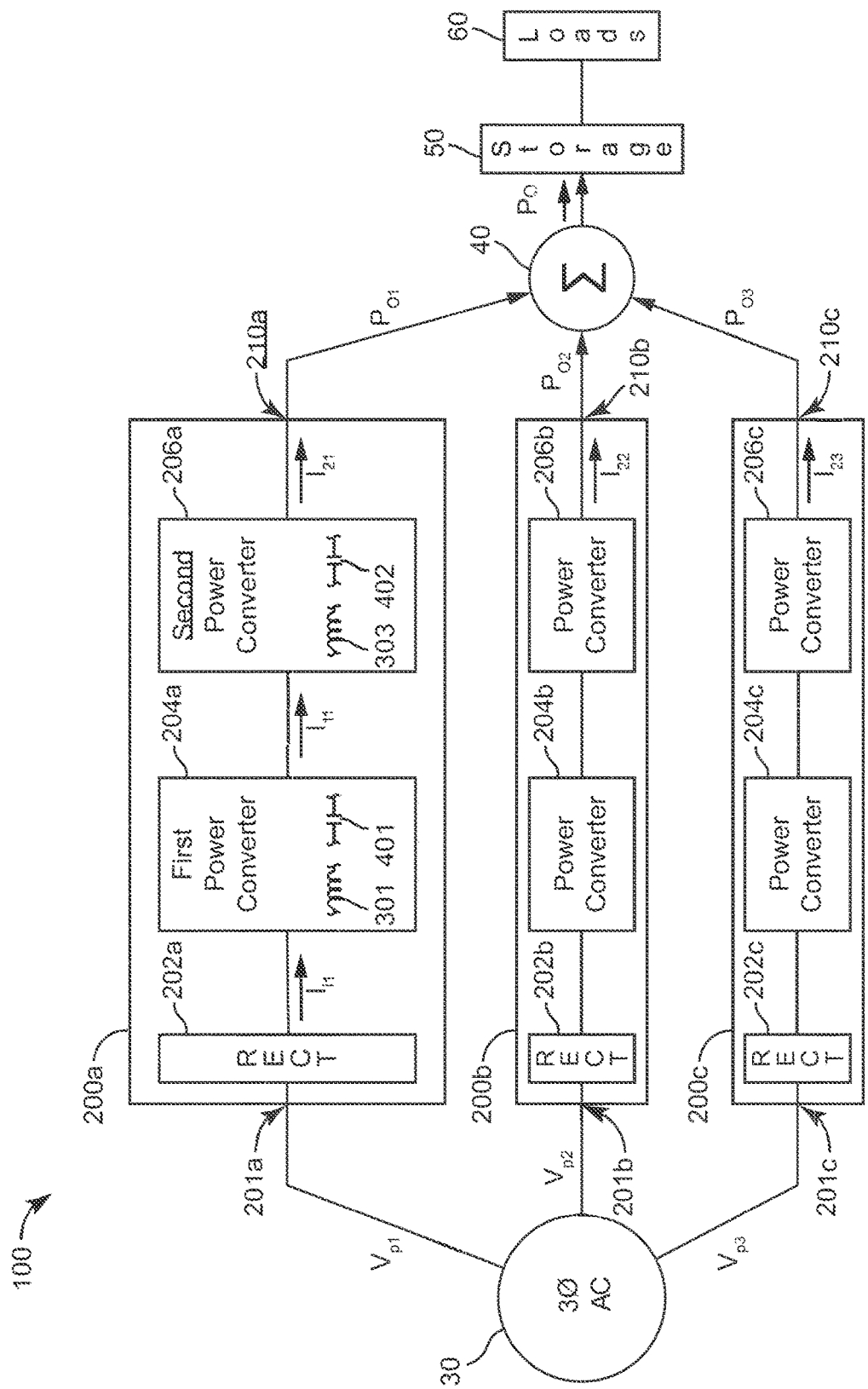
FIG. 1 shows a block diagram of a three-phase AC to DC isolated PFC power conversion system according to an illustrative embodiment.

FIG. 1 shows an isolated, power factor corrected, power system 100 that receives power from an AC source 30 having three phases, each having a respective substantially sinusoidal phase voltage (i.e., source waveform), $V_{p1}$, $V_{p2}$, $V_{p3}$, 120° out of phase with each of the other phases. The source frequency, fs, of the AC source 30 is generally relatively low, e.g. 50 Hz, 60 Hz, 400 Hz. As shown, the power system 100 includes three power processors 200a, 200b, 200c, each connected to receive power at its respective input 201a, 201b, 201c, from a respective phase, e.g. AC phase voltages, $V_{p1}$, $V_{p2}$, $V_{p3}$, and deliver a unipolar output (e.g., unipolar voltage) at its respective processor output 210a, 210b, 210c. Each of the power processors may include an optional input rectification circuit, e.g. rectifiers 202a, 202b, 202c connected to receive the respective AC phase voltage and deliver a rectified unipolar voltage to the input (e.g., first stage input) of a respective first power conversion stage, e.g. first power converters 204a, 204b, 204c shown in FIG. 1. The optional input rectifiers may be omitted for power conversion topologies capable of converting power directly from an AC input, i.e. having bipolar voltage swings, for delivery as a unipolar output. Each first power conversion stage (first power converters 204a, 204b, 204c, may be connected to deliver power via its respective output (e.g., first stage output) to the input (e.g., second stage input) of a cascaded second power conversion stage, e.g. cascaded second power converters 206a, 206b, 206c. Preferably, the output power delivered by each of the second power converters, $P_{oa}$, $P_{ob}$, $P_{oc}$, (e.g., second stage output) is combined with the output power of the other second power converters, e.g. as illustrated by the power summing junction 40 in FIG. 1, to produce a single unipolar output, Po, where the total output power $P_o=P_{oa}+P_{ob}+P_{oc}$. In a preferred embodiment, each second power conversion stage outputs a pulsating rectified sinusoidal, which when combined with the outputs of the second power conversion stages for the other two phases, sums to produce a common output that greatly reduces ripple and thus filtering requirements as discussed in more detail below. In some embodiments, the first stage output and/or second stage output may be a unipolar voltage characterized by a periodic ripple having a characteristic frequency and a characteristic period. Further, in some embodiments, the periodic ripple may include a series of pulses, the pulses being characterized by a pulse waveform, a pulse duration, and occurring at the characteristic frequency.

In the power system 100 of FIG. 1, at least one of the first and second power converters 204a, 204b in each power processor 200a, 200b, 200c is configured to provide galvanic isolation, preferably at a fixed voltage transformation ratio, between the power processor input and output and at least one of the first and second power converters in each power processor is configured to provide power factor correction, preferably without isolation, at the AC source to provide galvanic isolation between the input source and the output and to appear to the source as a resistive load. Thus, the AC current drawn from the AC source by the input of each power processor will, ideally, be sinusoidal and in phase with its respective phase voltage. In the example shown in FIG. 1, the input current to each first power converter will be a unipolar rectified sinusoid, which in practice may exhibit some distortion (preferably within the limits of regulatory standards). A characteristic feature of the power system 100 is that the first and second power converters each operate at a switching frequency much higher than, and will generally exhibit a power processing bandwidth that is large relative to, the source frequency of the rectified AC source. Consequently, substantially all of the bulk energy storage and low frequency filtering (e.g. filtering at frequencies associated with the frequency of the rectified source voltage, VR) may be provided at the output of the power system, preferably at a safe voltage, e.g. 50 VDC, by energy storage device 50. For example, the total energy storage provided in the power processors 200a, 200b, 200c may be a small fraction, e.g., 20%, 10%, 5%, 1%, or less of the energy storage provided by bulk storage at the output of the system, e.g. in energy storage device 50. Storage elements in the power processors 200a, 200b, 200c may include capacitive and inductive elements, e.g. inductor 401 and capacitor 301 in first power converter 204a; inductor 402 and capacitor 303 in second power converter 206a. The bulk storage at the output of the system, e.g. energy storage device 50, may comprise capacitive, battery, or other energy storage, for filtering, hold-up, or sustained operation in the event of AC power interruption. In some embodiments, the power processors 200a, 200b, 200c may be housed in a first package, and energy storage device 50 may be external to the first package. In some embodiments, rectifiers 202b, 202c, power converters 204b, 204c, and power converters 206b, 206c may have the same or similar components as rectifier 202a, first power converter 204a, and second power converter 206a.

Figure 2:
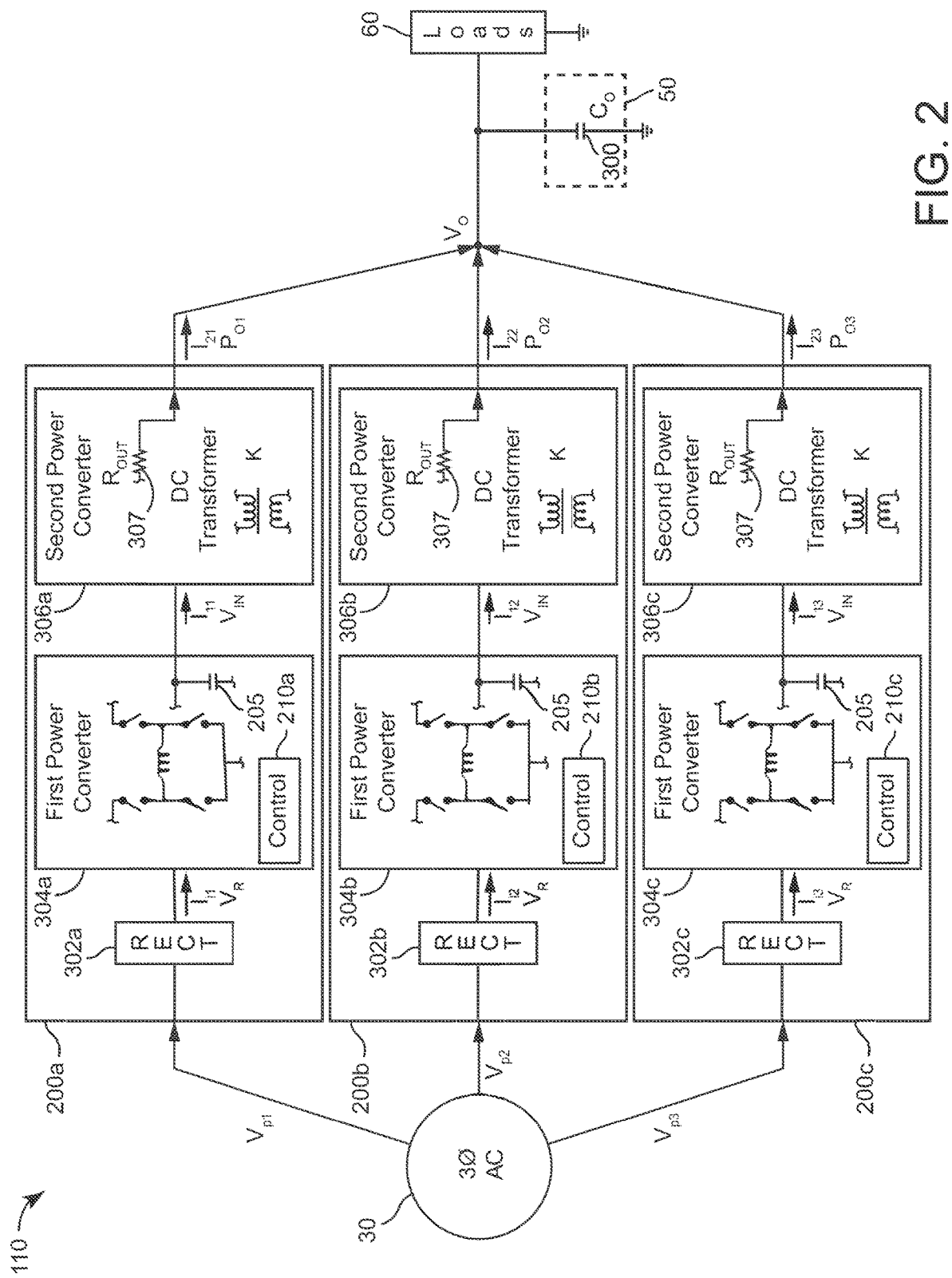
FIG. 2 shows an embodiment of a three-phase AC to DC isolated PFC power conversion system according to an illustrative embodiment.

FIG. 2 shows an embodiment 110 of the power system 100 of FIG. 1 in which the power processors 200 for each phase (power processors 200a, 200b, 200c) are shown each including: a full-wave rectifier 302 (302a, 302b, 302c) connected to receive AC power from a respective phase of the source and deliver a pulsating unipolar output to the first power conversion stage 304 (304a, 304b, 304c); a non-isolated buck-boost power-factor correcting switching power converter for the first power conversion stages 304; and a fixed ratio isolated DC Transformer for the second power conversion stages 306. The DC Transformers may be characterized by an essentially fixed transformation ratio defined as $K=V_{out}/V_{in}$ and a small equivalent series resistance, e.g. Rout, 307. In operation, the output voltage of the DC Transformer will be K times the voltage applied to its input, and the input current drawn by the DC Transformer will be K times its output current. Because the operating frequency of the DC transformer may be orders of magnitude higher, e.g. 1, 2, or 3 orders of magnitude or more, than the frequency of the pulsating unipolar input to the DC transformer, the output voltage and current of the DC transformer will be scaled replicas of those at its input. Waveforms for power processor 200a of FIG. 2 are shown in FIGS. 3A-3E. It is understood that the waveforms are intended to show generalized approximations of actual operation and not a high level of detail.

Figure 3A:
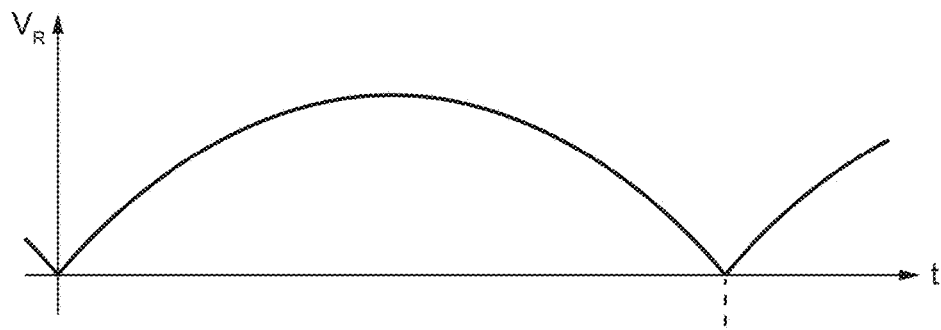
FIG. 3A shows a voltage waveform for the converter of FIG. 2.
Figure 3B:
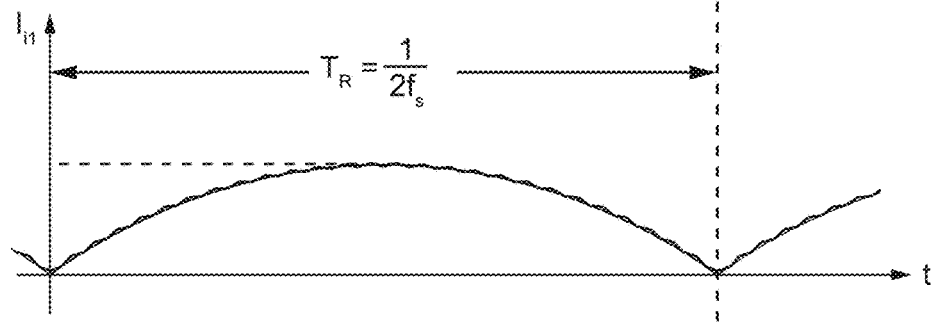
FIG. 3B shows a current waveform for the converter of FIG. 2.
Figure 3C:
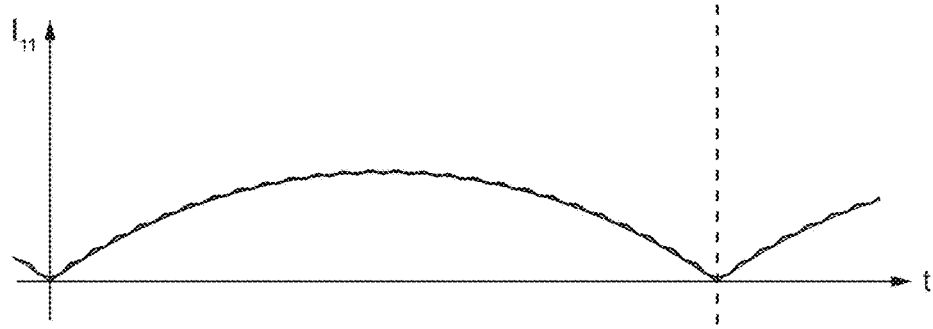
FIG. 3C shows a current waveform for the converter of FIG. 2.
Figure 3D:
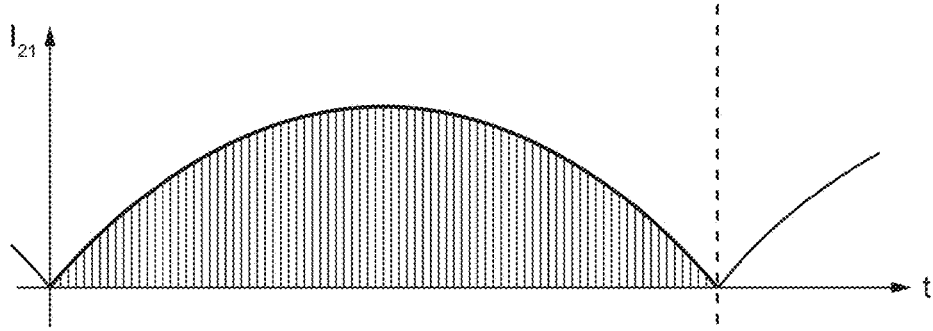
FIG. 3D shows a current waveform for the converter of FIG. 2.
Figure 3E:
FIG. 3E shows a voltage waveform for the converter of FIG. 2.

Buck-boost converter (the first power conversion stage 304) receives the full-wave rectified AC phase voltage, VR, (i.e. a pulsating unipolar voltage as shown in FIG. 3A) at its input from the full-wave rectifier 302a. The power factor correcting controller 210 receives signals (not shown) indicative of the time-varying voltage VR and the magnitude of the power system output voltage, $V_o$, and operates power switches within the first power converter to control the shape of the waveform of the input current $I_{i1}$ (FIG. 3B) to approximately conform to the shape of the waveform of VR and also control the amplitude of the input current to be at a value consistent with maintaining a desired magnitude of output voltage $V_o$. The first power converter may operate at a switching frequency, for, which is much higher than the frequency of the rectified source voltage ($f_{op} \gg f_R = 1/T_R = 2 * fs$), e.g. for may be 1, 2, or 3 orders of magnitude higher than $f_R$. The current delivered by the first power converter, $I_{11}$ (FIG. 3C) is received by the DC transformer and is transformed by the K factor of the transformer: $I_{21} = (1/K) * I_{11}$ (FIG. 3D).

In a non-idealized switching converter, i.e., switches used in the converter have parasitic capacitances and inductances, power may be dissipated in a switch when the switch is being turned on, which is called "switching loss." Capacitances, both parasitic and lumped, across a switch if not discharged before the switch is turned ON may be a major contributor to switching loss. One way to reduce switching loss in a switching power converter (e.g., a buck, a boost, or a buck-boost switching power converter) uses an inductive current to fully or partially charge and discharge the capacitances associated with a switch before turning it ON to achieve full or partial zero voltage switching ("ZVS") during an energy recycling interval ("ERI") (which may also be called a "ZVS" interval). ZVS ideally causes the voltage across the switch to decline to zero volts, essentially eliminating switching losses associated with the capacitive discharge of the switch; however, any significant reduction, e.g. by 50 percent, 80 percent, 90 percent, or more from the peak voltage across the switch, respectively reduces the switching losses during turn ON by 75 percent, 96 percent, 99 percent, or more. Turning switches ON and OFF at times when zero or minimal current is flowing through the switch, called zero current switching ("ZCS"), can also reduce losses and reduce noise. Accordingly, in some embodiments, power switches may be turned "ON" and "OFF" at times when a voltage across the power switch(es) is at a minimum. Further, in some embodiments, power switches may be turned "ON" and "OFF" at times when the voltage across the power switch(es) is essentially zero. In some embodiments, the power switches may be turned "ON" and "OFF" at times when a current flowing through the power switch(es) is at a minimum. Further, in some embodiments, the power switches may be turned "ON" and "OFF" at times when the current flowing through the power switch(es) is essentially zero.

As shown in FIGS. 1 and 2, the processor output currents $I_{21}$, $I_{22}$ and $I_{23}$ from the power processors for the three phases, are summed for the output of the power system.

Energy storage device 50, which may include a capacitor 300 (e.g., a bulk filter capacitance) as shown or battery back-up storage (not shown), may be made sufficiently large to smooth both the high frequency components of $I_{21}$ (e.g. related to for) and the current pulsations at the much lower rectified source frequency $f_R$, provide hold-up, or sustain back-up storage in the event of a power outage. Because there is relatively little energy storage within each power processor, the shape of the waveform envelopes of the currents at the inputs and outputs of the first and second converters are essentially the same and correspond to the waveform of the power factor corrected current, Ii, that is controlled to flow at the input of the first power converter. The term "power factor corrected current" may be used to refer to a current that has an envelope that substantially conforms to the shape of the waveform of the PFC current that is controlled to flow at the input to each first converter, and the three-phase isolated PFC converter (power system 100 FIG. 1; power system 110 FIG. 2) according to the invention may accordingly be characterized by a power factor corrected current flowing at each input of its constituent first power conversion stage, and in some embodiments at each input and output of its constituent first and second power conversion stages, varying in magnitude as it progresses through the processor but substantially maintaining the input PFC current waveform. The first power conversion stage may adjust an envelope of current drawn by the first stage input over a selected time interval as to approximate the source waveform during the selected time interval.

Both the first and second power converters in the power processors of FIG. 2 may require some internal energy storage to perform energy transfer and filtering. For example, first and second power converters may comprise inductive elements; a filter capacitor (e.g. capacitor 205, FIG. 2) may be required to smooth high frequency artifacts out of the current $I_{11}$; and filtering may be required in each power converter to minimize conducted interference at the power system input and output. These and other energy storage elements are sized to be effective over a time period that may be large with respect to the operating period of the converters, $T_{OP} = 1/f_{OP}$, but small with respect to the period of the rectified source, $T_R = 1/(2*f_S)$. By this means, the energy stored in converter internal energy storage elements may be made small compared to the energy that must be stored at the output to effect filtering at the rectified line frequency, $f_R$.

The first power converter 304a of FIG. 2 may be implemented preferably using any of a variety of known non-isolated switching regulator topologies, e.g. buck, boost, buck-boost; however, it may also be implemented using isolated topologies. The buck-boost topologies and power factor control methods described in Vinciarelli, Buck-Boost DC-DC Switching Power Conversion, U.S. Pat. Nos. 6,788,033 and 7,154,250 (one example of which is shown herein in FIG. 4); in Vinciarelli, Double-Clamped ZV'S Buck-Boost Power Converter, U.S. Pat. Nos. 7,561,446 and 7,920,391 (one example of which is shown herein in FIG. 5); and in Vinciarelli, Power Supply System with Power Factor Correction and Efficient Low power Operation, U.S. Pat. Nos. 8,222,772 and 9,087,656, all of which are incorporated here in their entirety.

The second power conversion stage 306 of FIG. 2 may be implemented using any of a variety of known DC Transformer topologies, preferably providing galvanic isolation. The isolated DC Transformer topologies, called Sine Amplitude Converters ("SAC"), described in Vinciarelli, Factorized Power Architecture with Point of Load Sine Amplitude Converters, U.S. Pat. No. 6,930,893 issued Aug. 16, 2005; and in Vinciarelli, Point of Load Sine Amplitude Converters and Methods, U.S. Pat. No. 7,145,786 issued on Dec. 5, 2006, each assigned to VLT, Inc. and incorporated here in their entirety (collectively the "SAC" patents) (one example of the SAC topology is shown herein in FIG. 6) may advantageously be deployed for the second power conversion stages 306 shown in FIG. 2.

Power sharing among the three power processors 200a, 200b, 200c, i.e. across the three phases, may be balanced by their effective output resistances (i.e. output voltage droop). In some embodiments the topologies of the first and second converters may require that a control loop be provided to ensure power sharing.

It may be desirable in some embodiments to implement a first and/or second converter by connecting two or more constituent power converters in series or in parallel. In some systems the magnitude of, or the range of variation in, an input voltage source may present challenges that a single power converter design cannot efficiently or practicably address. Serial connection of a plurality of low voltage units across a higher voltage source may allow more efficient converter operation, e.g. because use of lower voltage switching devices exhibiting better figures of merit than higher voltage devices may be used to reduce losses and increase converter efficiency. Similarly, parallel connection of a plurality of units may provide increased output power and better scalability. In some applications, adaptive configuration of power converter cells linked via a common transformer or individual power converters, i.e. arrays (i.e. controlling the series/parallel arrangement of converters based upon operating conditions) can provide for efficient operation over a wide input voltage range and can enable accommodation of variations in output voltage and load. Static and adaptively configured arrays of buck-boost converters and SAC DC transformers, and integrated arrays of two or more SAC DC transformers linked by a common transformer core, are described in Vinciarelli, Adaptively Configured Voltage Transformation Module Array, U.S. Pat. Nos. 7,170,764 (the "VTM Array" patent) and 7,420,825 (the "Integrated VTM Array" patent); Vinciarelli, Adaptively Configured and Auto-ranging Voltage Transformation Module Arrays, U.S. Pat. Nos. 7,212,419 (the "Adaptive Integrated VTM array" patent) and 7,423,892 (the "Series Connected" patent); and Vinciarelli, Adaptively Configured and Auto-ranging Power Converter Arrays, U.S. Pat. No. 7,782,639 (the "DCZVS Array" patent); all of which are assigned to VLT, Inc. and incorporated here in their entirety by reference (collectively the "Converter Array" patents).

Figure 7:
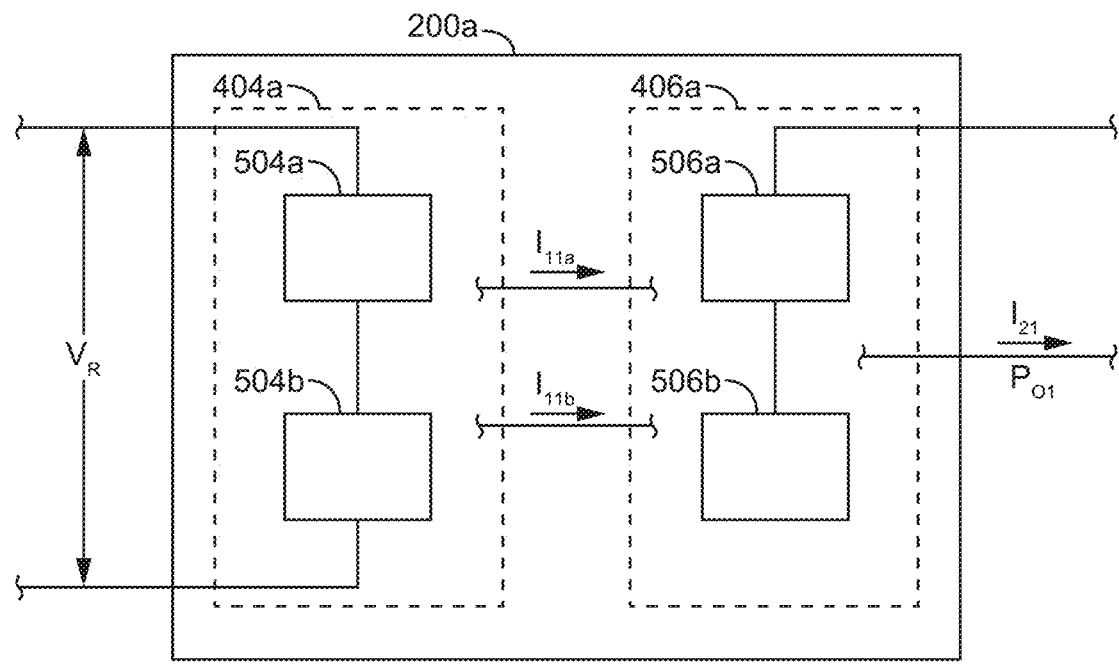
FIG. 7 shows a power processor comprising arrays of power converters according to an illustrative embodiment.

FIG. 7 shows a generalized block diagram of a power processor 200a comprising a first power converter stage 404a comprising an array of two power converters 504a, 504b, e.g. which may be power factor correcting buck-boost converters, and a second power converter stage 406a comprising an array of two power converters 506a, 506b, e.g. which may be SAC DC Transformers. The connections within arrays may be fixed or adaptive as described in the Converter Array patents to meet the needs of the specific application. FIG. 7 is an illustrative example, which is not intended to be limiting, showing the first and second power converter stages, 404a, 406a, each comprising an array of two individual power converters connected in series to share the input voltage: 404a includes series connected power converters 504a and 504b (e.g., first conversion circuits), and 406a includes series connected power converters 506a and 506b (e.g., second conversion circuits). The first conversion circuits may each include a first circuit input and a first circuit output. In some embodiments, two or more of the first circuit inputs may be connected in series across the first stage input (e.g. VR). The second conversion circuits may each include a second circuit input connected across a respective first circuit output. Although each stage is shown comprising two converters connected in series in FIG. 7, it should be understood that any fixed or adaptive combination may be used.

Figure 8:
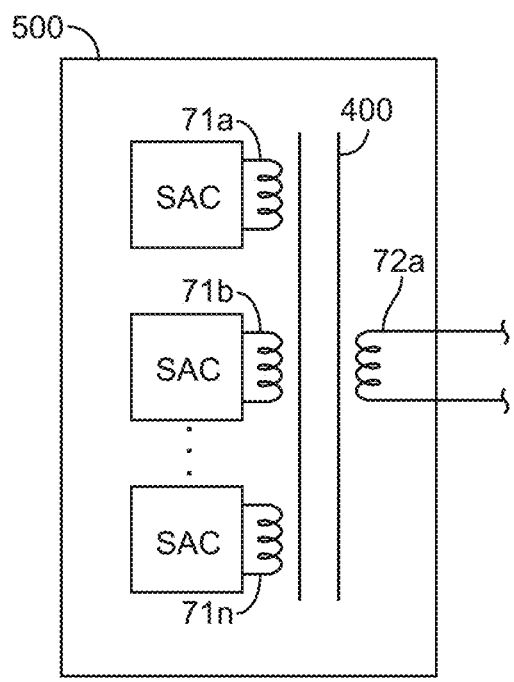
FIG. 8 shows an integrated array of DC Transformer cells sharing a common transformer core according to an illustrative embodiment.

FIG. 8 shows an example of an isolated DC transformer comprising an integrated SAC array. In the example of FIG. 8, a plurality, n, of SAC input cells including respective primary windings 71a, 71b, through 71n are coupled to a common transformer core with a secondary winding 72a which may be connected to a SAC output cell for rectification. The input cells may be configured in series, parallel, or a combination of series and parallel connections to share equally in the input voltage and current to drive the transformer. Although only a single secondary winding is shown in the figure, a plurality may be provided to distribute the output voltage and current among output cells. Integrated SAC arrays are described in more detail generally in the Converter Array patents and more specifically in the Integrated VTM Array and Adaptive Integrated VTM Array patents. An integrated SAC array may preferably be used for the second power conversion stages of the power system 100 and 110 of FIGS. 1 and 2.

Figure 10:
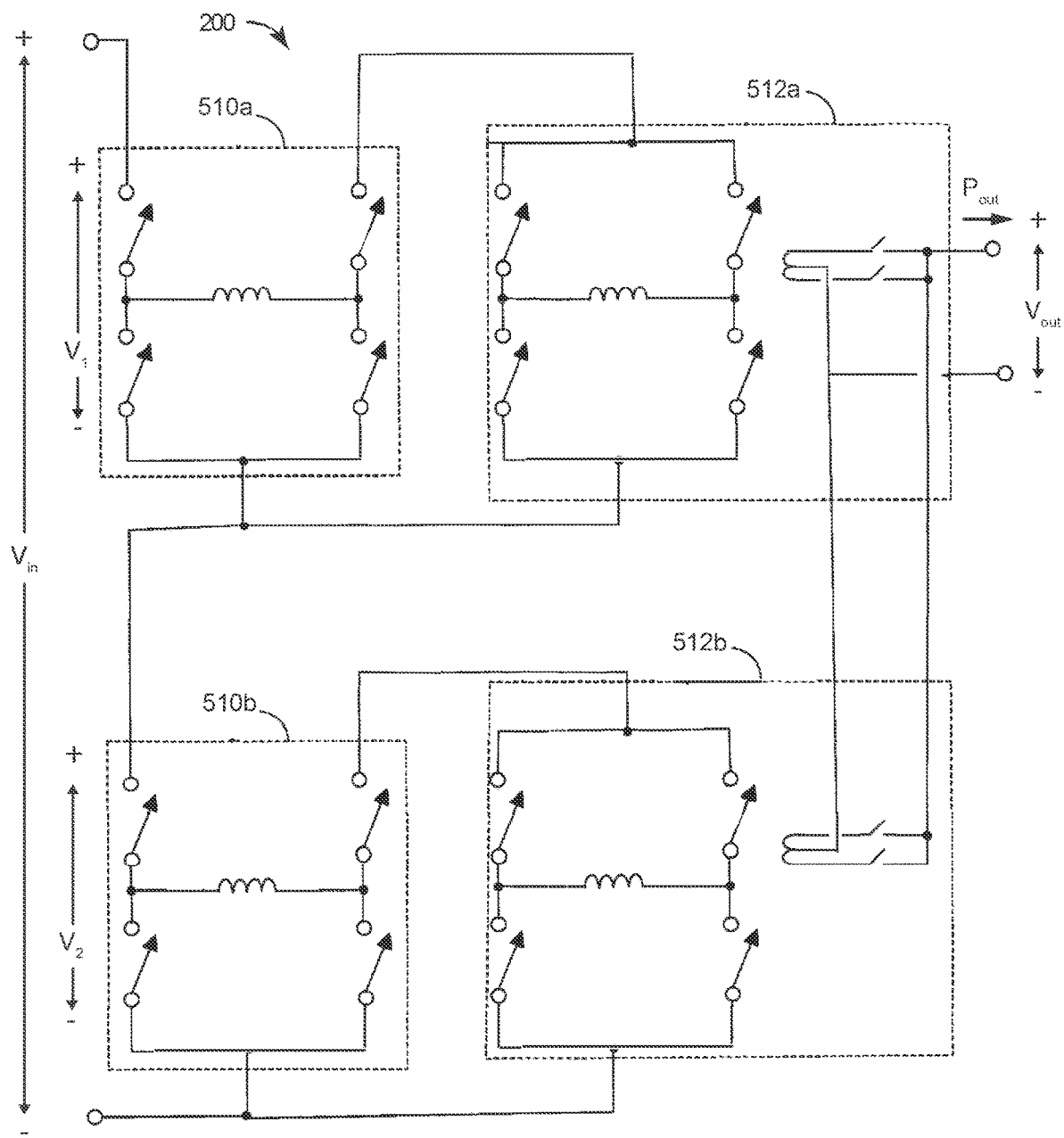
FIG. 10 shows a power processor comprising interconnected power converters according to an illustrative embodiment.

Referring to FIG. 10, which shows a power processor configuration 200 comprising four independent power converters that exploits additional advantages of the converter array. In FIG. 10, two buck-boost converters 510a, 510b of the type shown in FIG. 4 and described in the Buck-Boost patents are connected in series across the processor input voltage, Vin, to share equally in the relatively high input voltage. The non-isolated buck-boost converter topology however does not readily lend itself to equally dividing the input voltage when connected in series. As shown in FIG. 10, two DC transformers, which preferably may be SAC based topologies have their inputs connected in series and their outputs connected in parallel. All four converters, 510a, 510b, 512a, 512b, shown in the example of FIG. 10 may be independent of each other, e.g. no magnetic coupling between the converters. Note that the converter blocks in FIG. 10 are schematic representations of the respective topologies but do not include all of the details of each converter, e.g. input and output capacitors and switch controllers for each converter block, and the resonant capacitors for SAC based DC transformers, are not shown in FIG. 10).

As shown in FIG. 10, the first power conversion stages and second power conversion stages are interconnected with the input of the first DC-transformer 512a connected across the output of the first buck-boost converter 510a, the input of the second DC-transformer 512b connected across the second buck-boost converter 510b, the inputs of the first and second buck-boost converters connected in series across the input to divide the input voltage, VIN, between them, and the isolated, rectified, outputs of the two DC-transformers connected in parallel to deliver the processor output power, $P_{out}$, at the output voltage, $V_{out}$.

The parallel connection of the outputs of the two DC Transformers 512a and 512b (which have the same transformation ratio, K) forces their inputs to divide the input voltage equally, which in turn forces the non-isolated buck-boost converters, 510a, 510b, connected to their inputs in the manner shown in FIG. 10 to share equally in dividing the input voltage, facilitating and greatly simplifying dividing the input voltage between the non-isolated first stage converters which would not unaided divide voltage equally in a series connection. The result is power being shared equally by the non-isolated buck-boost converters and the input voltage, $V_{in}$, being divided equally between the buck-boost converter inputs (i.e. $V_1$ is essentially equal to $V_2$). As mentioned above, alternative embodiments may use an integrated DC transformer array having a multiplicity of input cells coupled to a common transformer in the second power conversion stage to force the voltage sharing by the non-isolated regulator stages in the first power conversion stage.

Figure 11:
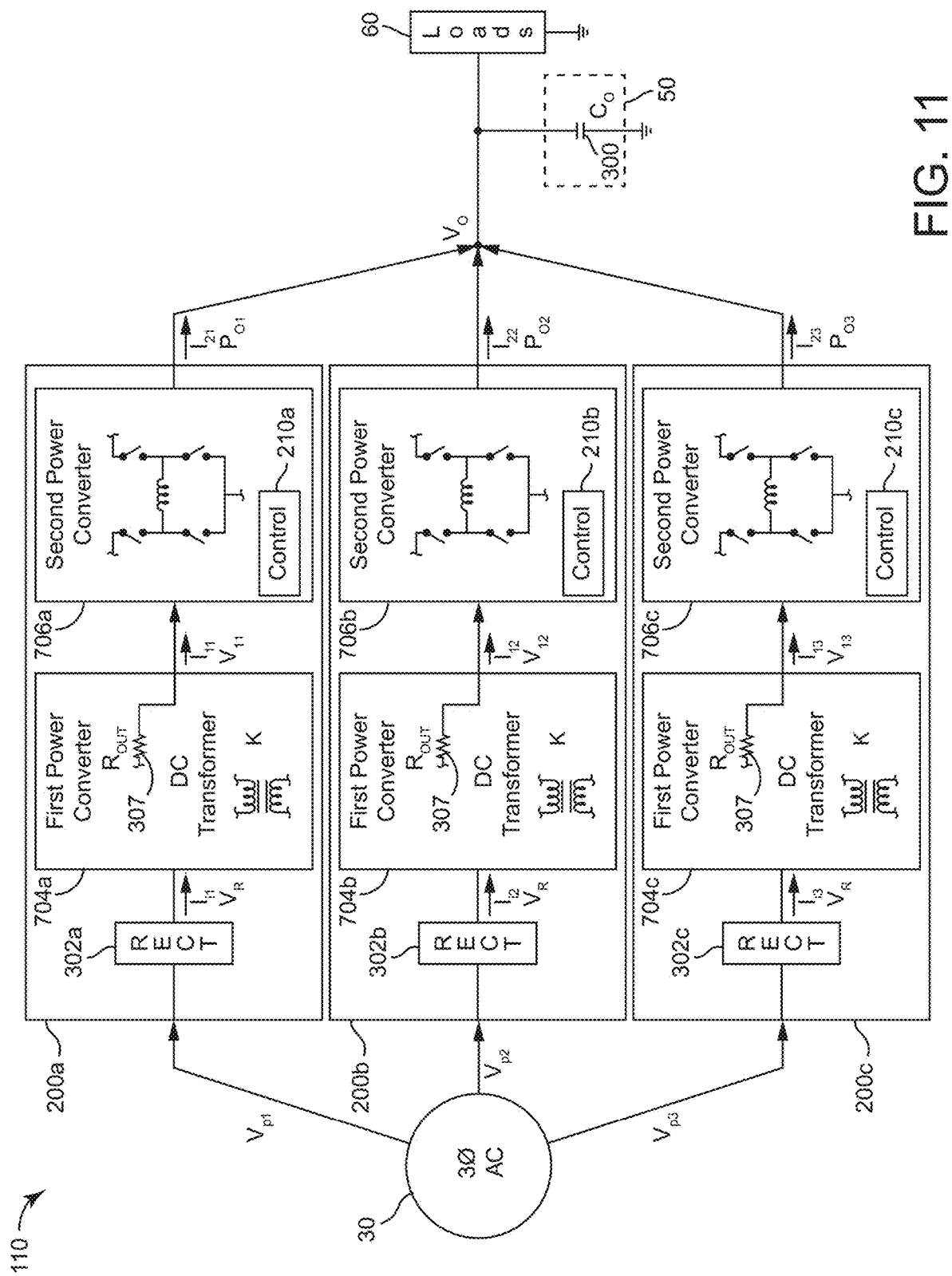
FIG. 11 shows an embodiment of a three-phase AC to DC isolated PFC power conversion system according to an illustrative embodiment.

Although the preceding examples describe power processors (e.g. power processor 200) in which first power converters (e.g. 204, 304) comprise power factor correcting converters and second power converters (e.g. 206, 306) comprise isolated DC Transformers, a wide variety of other power processor configurations are possible. For example, FIG. 11 shows an embodiment 110 of the power system 100 of FIG. 1 in which the power processors 200 for each phase (power processors 200a, 200b, 200c) are shown each including: a full-wave rectifier 302 (302a, 302b, 302c) connected to receive AC power from a respective phase of the source and deliver a pulsating unipolar power output to the first power conversion stage 704 (704a, 704b, 704c); a fixed ratio isolated DC Transformer for the first power conversion stages 704; and a non-isolated buck-boost power-factor correcting switching power converter for the second power conversion stages 706. The DC Transformers may be characterized by an essentially fixed transformation ratio defined as $K=V_{11}/V_R$ and a small equivalent series resistance, e.g. Rout 307. In operation, the output voltage of the DC Transformer will be K times the voltage applied to its input and the input current drawn by the DC Transformer will be K times its output current. Because the operating frequency of the DC transformer may be orders of magnitude higher, e.g. 1, 2, or 3 orders of magnitude or more, than the frequency of the pulsating unipolar input to the DC transformer, the output voltage and current of the DC transformer will be scaled replicas of those at its input. Buck-boost converter (the second power conversion stage 706 in FIG. 11) receives the output of the DC Transformer, $V_{11}$, which is the full-wave rectified AC phase voltage, VR, scaled down by the transformation ratio (i.e. $V_{11}=V_R*K$). The power factor correcting controller 210 receives signals (not shown) indicative of the time varying voltage $V_{11}$ and the magnitude of the power system output voltage, $V_o$, and operates switches within the second power converter to control the shape of the waveform of the input current $I_{11}$ to approximately conform to the shape of the waveform of $V_{11}$ and also control the amplitude of the input current to be at a value consistent with maintaining a desired magnitude of output voltage $V_o$. The second power converter may operate at a switching frequency, for, which is much higher than the frequency of the rectified source voltage ($f_{OP}>>f_R=1/T_R=2*f_S$), e.g. for may be 1, 2, or 3 orders of magnitude higher than $f_R$. The power factor correcting controller 210 may be configured to operate the switches in a series of converter operating cycles, with each cycle having a duration that is 1% or less of the characteristic period. The input current to the DC Transformer (the first power conversion stage 704), $I_{i1}$, is a scaled version of the current $I_{11}$: $I_{i1}=I_{11}*K$. The power factor correcting converters preferably may use a non-isolated topology as described above or alternatively use isolated topologies. One or the other or both of the first and second power converters may comprise any of a wide variety of switching converter topologies.

Figure 4:
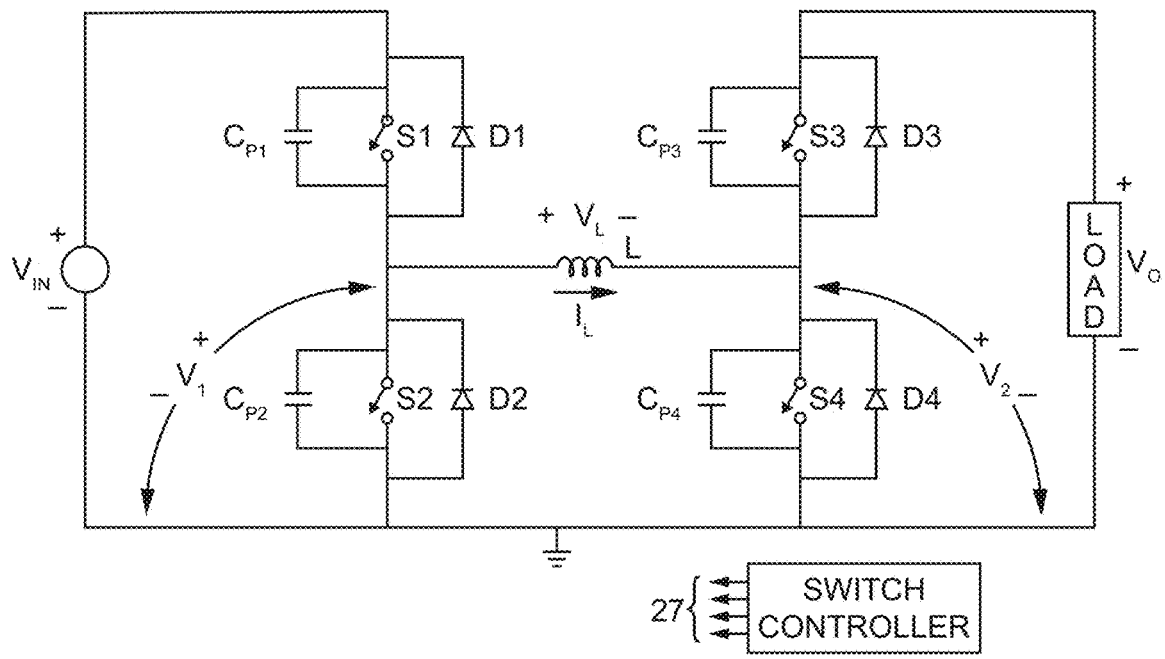
FIG. 4 shows a prior art buck-boost converter.
Figure 5:
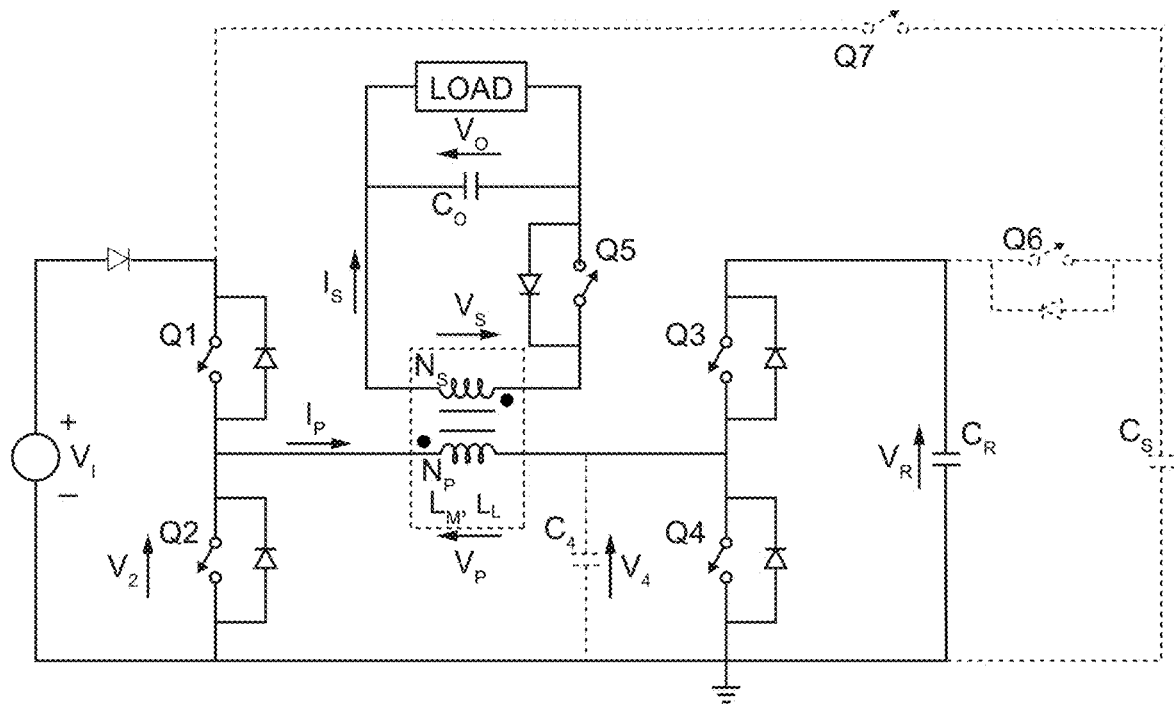
FIG. 5 shows a prior art double-clamped ZVS buck-boost power converter.
Figure 6:
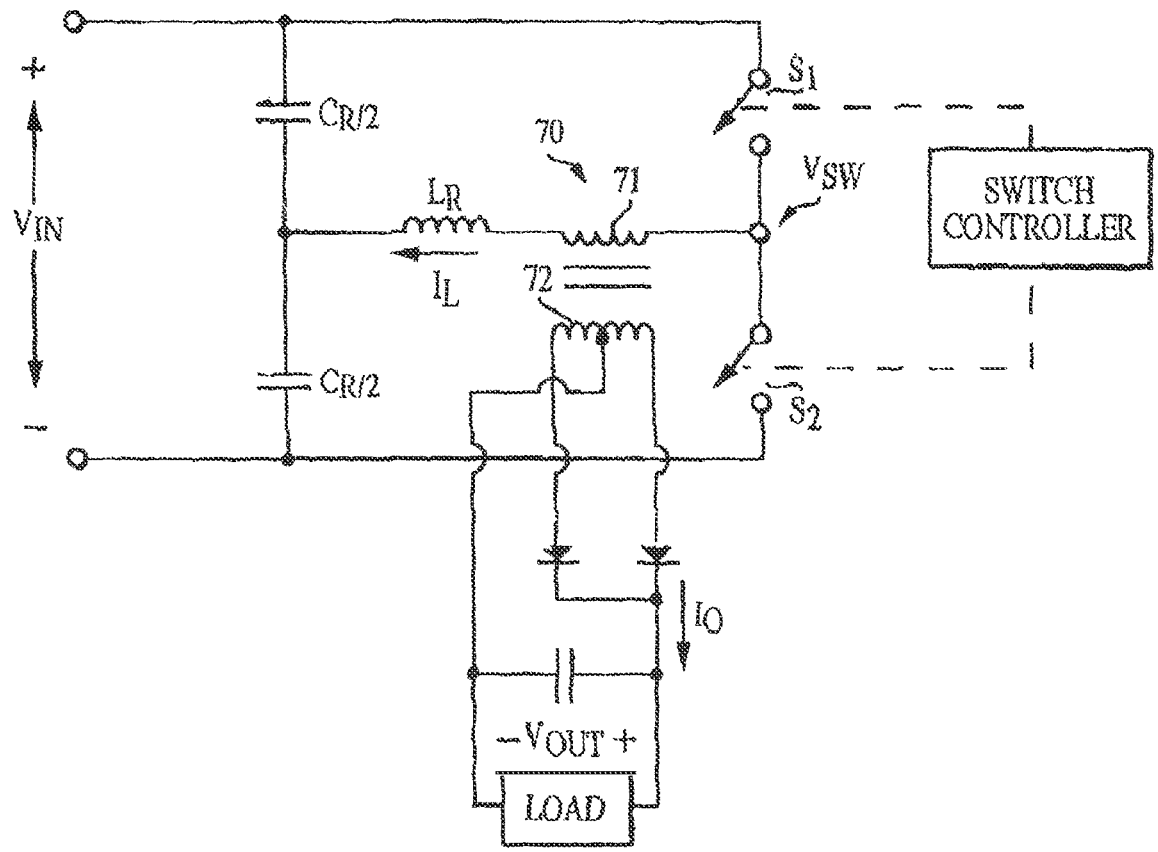
FIG. 6 shows a prior art Sine Amplitude Converter.
Figure 12A:
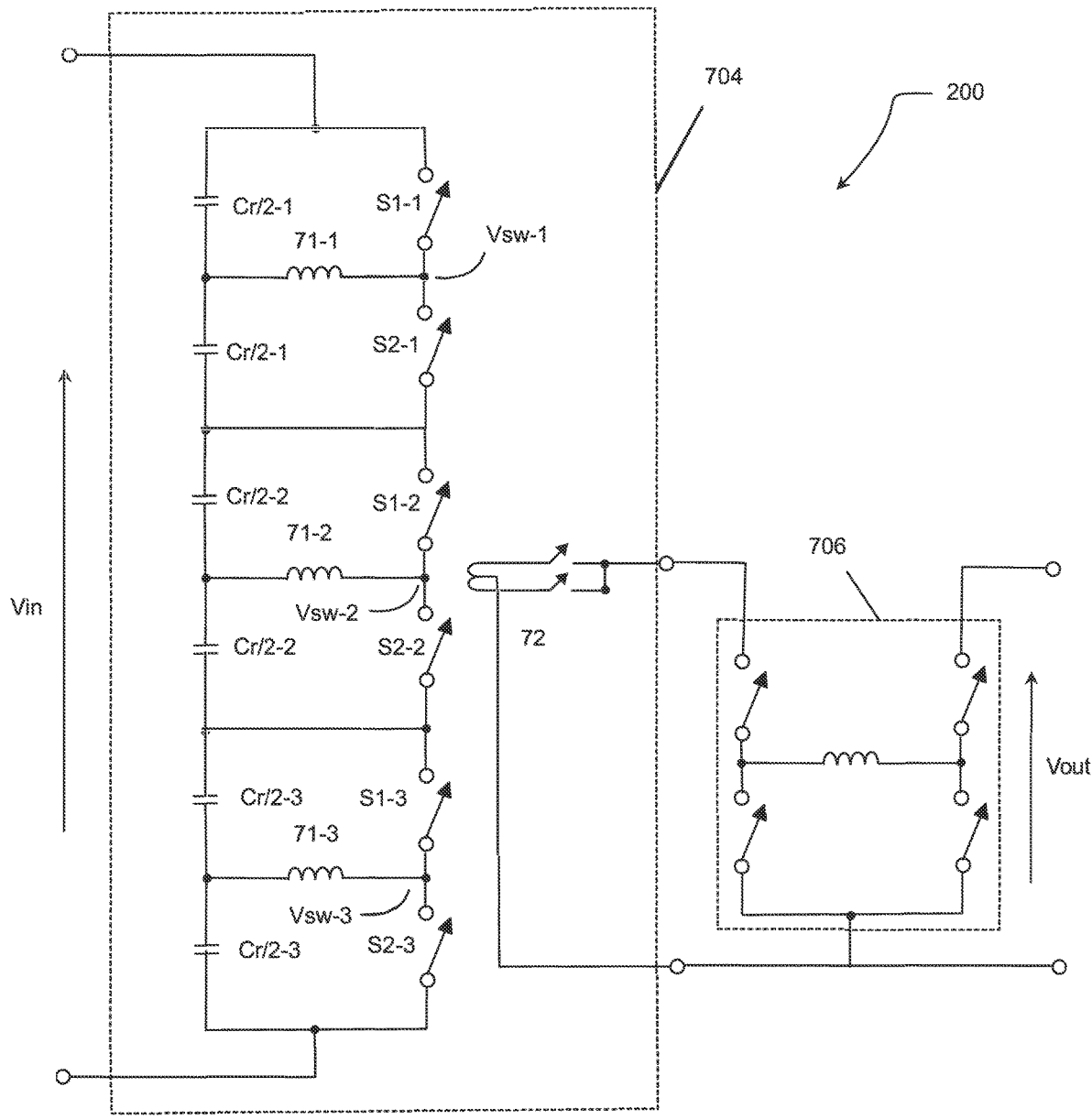
FIG. 12A shows an embodiment of a power-processor including an isolation stage having a plurality of series-connected half-bridge input cells followed by a second stage PFC regulator.

Referring to FIG. 12, a preferred embodiment of the first stage 704 of the power processor 200 based upon the SAC topology shown in FIG. 6 may include a plurality, e.g. a number, n, where n>1, of series-connected input cells to divide the input voltage, Vin, such that the input voltage of each input cell is $1/n^{th}$ of the input voltage, Vin. As shown, three half-bridge input cells each include two primary switches, e.g. primary switches S1-1, S2-1, a primary winding, e.g. primary winding 71-1, and two resonant capacitors, Cr/2-1. The primary windings, 71-1, 71-2, 71-3, of each input cell are coupled to the secondary winding 72 of the output cell (or cells), which using secondary switches operated as controlled rectifiers provides output rectification. The second stage 706 preferably may be a non-isolated buck boost converter, e.g. as shown in FIG. 4, preferably operated with power factor correction as described above in connection with FIG. 11.

Figure 12B:
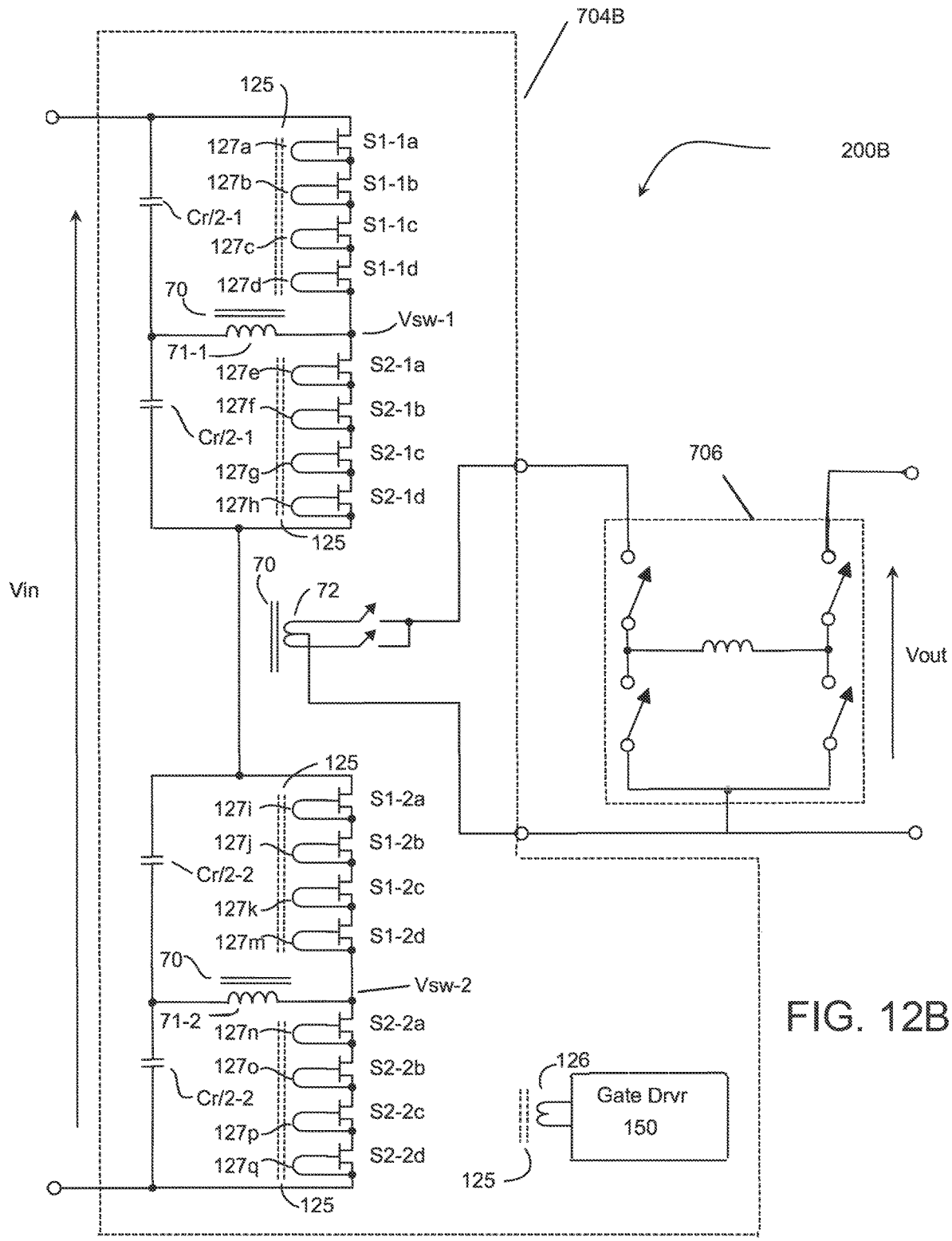
FIG. 12B shows an embodiment of a power-processor including an isolation stage having a plurality of series-connected half-bridge input cells with series-connected semiconductor devices implementing each primary switch followed by a second stage PFC regulator.

The primary switches in the first stage, e.g. S1-1, S1-2, S1-2, S2-2, S1-3, and S3-3, may have a maximum voltage rating that is much lower than the input voltage, Vin, or the phase voltage, Vp1 (FIG. 11). For the three input-cell (n=3), half-bridge configuration shown, each primary winding is driven with one sixth ($1/6^{th}$) of the input voltage, Vin, and each primary switch needs to only block one third ($1/3^{rd}$) of the input voltage. The example of FIG. 12 may be used for a K=⅙ transformation ratio, which may be well adapted to convert 240 VAC to 40VRms to 50V. The voltage across each primary switch may be further reduced by cascading a plurality, e.g. a number, x, where x>1, of semiconductor devices to implement each of the primary switches shown, e.g. primary switches S1-1, S1-2, etc., at the expense of a more complicated gate drive circuit described in more detail below in connection with FIG. 12B. Although three input cells (n=3) are shown in FIG. 12, any number of cells may be provided to suit the needs of the application, e.g. a four cell half-bridge configuration may be used for a K=⅛ transformation ratio, etc. Although one could increase the number, n, of series-connected input cells to divide high input voltages, resonant capacitance in each of the cells may become a limiting factor going beyond 3 cells in a resonant converter.

Similarly misplaced is the common belief that new technology higher voltage switches, such as GAN FETs with a 600 Volt rating and low input capacitance, will provide the performance answer for high-input voltages because the parasitic capacitance of high voltage transformer windings is a limiting factor for high frequency, and thus high density, solutions. Contrary to this belief, higher performance and higher power density may be achieved using a plurality of cascoded low-voltage switching devices, (x>1), in a multi input-cell (n>1) topology, such as the preferred example SAC example shown in FIG. 12B. As shown, a power processor 200B includes a first stage, 704B based upon the SAC topology, with two input-cells (n=2) connected in series to divide the input voltage, Vin, i.e. with each input cell sharing in one half of the input voltage (Vcell=Vin/n=Vin/2). Using the half bridge topology, each primary winding, 71-1 and 71-2, is driven with one half of the cell input voltage and thus one quarter of the input voltage, Vin/4. The power transformer core, 70, is shown in FIG. 12B with solid lines to distinguish the gate drive transformer core, 125, which is shown in broken lines. As shown in FIG. 12B, each primary switch, e.g. primary switches S1-1, S2-1, S1-2, and S2-2, in the primary cells may preferably be implemented with a number, x, of series-connected semiconductor devices, where x>1, or x>2, and more preferably x>3. Four series-connected devices (x=4), which may e.g. be low-voltage devices (compared to the input voltage, Vin, or cell input voltage, Vcell) are shown making up each primary switch. In the example shown, each semiconductor device will switch one quarter (¼) of the cell input voltage (Vdev=Vcell/x=Vcell/4), which is one eighth (⅛) of the input voltage, Vdev=Vin/(n*x)=Vin/8, and the primary winding of each primary cell will be excited by one half (½) of the cell input voltage, which is one quarter (¼) of the input voltage, Vin/4. Preferably, the product, P, of the number, n, of input cells and the number, x, of series connected devices making up each primary switch is greater than 4 (P=n*x>4), e.g. the example of FIG. 12B uses a product, P=n*x=8. Using two (x=2), three (x=3), or four (x=4) cascoded devices for each of the primary switches in the three-input cell example of FIG. 12 yield products, P=6, P=9, or P=12, respectively.

The example shown in FIG. 12B using a product, P=8, reduces the maximum voltage across each of the semiconductor devices significantly, i.e. by a factor of 8 compared to the input voltage. Using an offline application having a maximum input voltage of 400V, Vin=400Vmax, as an example for the circuit shown in FIG. 12B, the maximum cell input voltage will be Vin/n=400/2=200Vmax, the maximum primary winding voltage in the half-bridge topology will be Vcell/2=200/2=100V, the maximum voltage across each primary switch will be Vcell=200Vmax, and the maximum voltage across each semiconductor device will be Vcell/x=200/4=50Vmax, which is 1/P=⅛ of the input voltage, Vin. It will therefore be appreciated that 60, 80, or 100 Volt semiconductor devices may be series connected to implement the primary switches, S1-1, S1-2, S1-2, S2-2, e.g. four 60, 80 or 100 Volt series-connected silicon MOSFETs, e.g. S1-1$a$, S1-1$b$, S1-1$c$, S1-1$d$, may be used to implement each primary switch, e.g. switch S1-1. Furthermore, the device voltage rating, e.g. 80V, is much lower than the maximum input voltage, Vin, 400 VDC (which may correspond to the peak phase voltage, Vp1 (FIG. 11), for an offline application. With only two input cells, n=2, the resonant capacitance of the example in FIG. 12B may be kept low enough at high switching frequencies (and thus high power density) and dividing the input voltage between two cells allows for an acceptable level of parasitic capacitance in the transformer windings avoiding the need for excessive magnetizing current for ZVS and ZCS operation. The half-bridge topology further reduces the voltage across the primary winding allowing for fewer turns.

Also, the maximum voltage being switched at each of the switching nodes, e.g. nodes Vsw-1 and Vsw-2, in FIG. 12B will be 100Vpeak (200V peak to peak), which is greater than the 100V primary winding voltage, but presents an acceptable compromise between the transformer winding parasitic capacitance and maximum switching node voltage in the converter. By comparison, the 200V maximum switching node voltage of FIG. 12B is greater than the 133V maximum for the switching nodes, Vsw-1, Vsw-2, and Vsw-3 of the three-input cell (n=3) example in FIG. 12; but, the tradeoff in higher node voltage for the two input-cell (n=2) example may be acceptable in view of the reduced resonant capacitance. Although the switching node voltage may seem relatively high, the maximum voltage being switched by each of the devices is 1/x or ¼$^{th}$ of the switch node voltage, i.e. 50V.

Referring to Table 1 below, several key parameters of several commercially available semiconductor devices are provided, including maximum drain to source voltage, Vds, on-state resistance at temperature, Rds(on), the gate to source voltage, Vgs, the gate charge, Qg, and the output charge, Qoss. Additionally, first and second order figures of merit ("FOM") are calculated for each device: the first order FOM is the product of output charge and on state resistance, Qoss*Rds; and the second order FOM is the product of gate charge, gate voltage and on state resistance divided by the square of drain to source voltage, Qg*Vgs*Rds/(Vds)². The BSC600N25NS3 device is a more mature 250V silicon MOSFET device having a relatively large (unfavorable) first and second order values (4700, 0.28) compared to that of the newer 350V GaN device, EPC2050 (1755, 0.01). As shown, the very low input capacitance of the GaN device produces a very low (favorable) second order FOM value. As shown, the higher voltage devices have much larger (unfavorable) first order FOMs compared to the lower voltage devices. Entries are also provided for sets of three (x=3) and four (x=4) cascoded low voltage devices, SiSS30LDN (80V) and SiSS26LDN (60V), respectively for use as a 240V composite device. As shown in the table, the on-resistance Rds(on), and output charge, Qoss, of the cascoded devices represents the series equivalent of the discrete devices, which results in an increase in resistance by the factor x and a decrease in capacitance or charge by the factor x.

TABLE 1

First and Second Order Figures of Merit.

|  | Vds | Rds(on)@ 100 C. | Vgs | Qg | Qoss | First Order Qoss * Rds | Second Order Qg * Vgs * Rds/Vds^2 |
|---|---|---|---|---|---|---|---|
| Discrete Devices |  |  |  |  |  |  |  |
| BSC600N25NS3 | 250 | 100.0 | 8.0 | 22.0 | 47.0 | 4700 | 0.28 |
| EPC2050 | 350 | 65.0 | 5.0 | 3.4 | 27.0 | 1755 | 0.01 |
| FDMS86202ET120 | 120 | 11.9 | 8.0 | 37.0 | 60.0 | 714 | 0.24 |
| SiSS42LDN | 100 | 24.0 | 4.5 | 14.8 | 24.7 | 593 | 0.16 |
| SiSS30LDN | 80 | 15.7 | 4.5 | 14.2 | 27.0 | 424 | 0.16 |
| SiSS26LDN | 60 | 6.7 | 4.5 | 14.3 | 28.3 | 190 | 0.12 |
| Cascoded Devices |  |  |  |  |  |  |  |
| SiSS30LDN (x = 3) | 240 | 47.1 | 4.5 | 42.6 | 9.0 | 424 | 0.16 |
| SiSS26LDN (x = 4) | 240 | 26.8 | 4.5 | 57.2 | 7.1 | 190 | 0.12 |

Table 2 below compares the figures of merit of the high voltage discrete devices with the cascoded low voltage devices. As can be seen from the comparison, the cascoded low-voltage devices represent significant advantages in first order FOM over the higher voltage discrete devices, including the GaN device. The second order FOM for the GaN discrete device is better than the cascoded low voltage devices, but, since this is a second order effect, the cascoded discrete devices represent the better choice, particularly with a gate driver that recycles gate energy as described below. One might mistakenly assume that the output charge (or output capacitance) represented in the first order FOM becomes irrelevant in a ZVS topology that recycles that energy; however, higher output capacitance or charge does impact the duty cycle, operating frequency, and/or magnetizing current level required for ZVS operation thus affecting converter efficiency and power density. It is therefore preferable to keep the voltage across each switching device below 120V, more preferably less than or equal to 100V, more preferably less than or equal to 80V, and most preferably less than or equal to 60V.

relative to other devices would subject it to a substantially higher share of the cell input voltage, causing increased switching loss in the device. The ZVS and ZCS power train coupled with consistent gate drive make small relative voltage errors in the devices possible. Together, ZCS and ZVS of the power train and controlled charging and discharging of the device control terminals allow low voltage devices to be reliably operated in series-connected implementations of high-voltage power switches such as in the topology shown in FIG. 12B.

Silicon based MOSFET devices may be used advantageously in such applications owing to the negative temperature coefficient of their gate threshold voltage. Should one

TABLE 2

Discrete vs. Cascode Comparisons

| Discrete vs. Cascode Comparison | Application Voltage | Relative First Order FOM (Qoss*Rds) | Relative Second OrderFOM (Qg*Vgs*Rds/Vds?2) |
|---|---|---|---|
| BSC600N25NS3 vs. 3 × SiSS30LDN | 240 V | 4700/424 = 11 × Cascode Advantage | .31/.16 = 1.9 × Cascode Advantage |
| EPC2050 vs. 3 × SiSS30LDN | 240 V | 1755/424 = 4.1 × Cascode Advantage | .156/.009 = 17.4 × Discrete Advantage |
| EPC2050 vs. 4 × SiSS26LDN | 240 V | 1755/190 = 9.3 × Cascode Advantage | .12/.009 = 13.3 × Discrete Advantage |

As shown in FIG. 12B, a gate drive circuit 150 may operate the series-connected devices, e.g. S1-1$a$ S1-1$b$, through S2-2$d$ using a multi-winding gate drive transformer, e.g. gate drive transformer 125, which may have a winding dedicated to each device, e.g. gate drive winding 127$a$ for device S1-1$a$, 127$b$ for S1-1$b$, through 127$q$ for S2-2$d$. A preferred transformer coupled gate drive controller suitable for driving a multiplicity of devices is shown and described, see e.g. controller 150 FIG. 4, in Vinciarelli, Adaptive Control of Resonant Power Converters, U.S. Pat. No. 10,020,752 issued Jul. 10, 2018 and U.S. Pat. No. 10,153,704 issued Dec. 11, 2018, both of which are assigned to VLT, Inc. and incorporated here in their entirety by reference (the "ASAC patents"). The ASAC gate driver uses the magnetizing current of the gate drive transformer 125 to resonantly charge and discharge the parasitic capacitances associated with the control terminal of each semiconductor device, e.g. S1-1$a$, S1-1$b$, S1-1$c$, S1-1$d$ through S2-2$d$ (see the second order FOM above) and as explained in the ASAC patents, may control the duration of those transitions.

The SAC topology of the power train allows the primary switches to be operated with ZVS (resonantly charging and discharging the output capacitance of each primary switch thus recycling energy in the output capacitance (see first order FOM above)) and ZCS (subject to the magnetizing current of the power transformer) transitions as described in the SAC patents. The combination of the ZVS and ZCS power train which controls the voltage and current transitions across the switches, and the controlled gate driver ZVS, which may use slow, i.e. shallow, transitions on the control terminals of the devices, combine to allow the series-connected devices making up each primary switch to be operated with consistent rise times and voltage transitions. The gate driver may operate each device with small timing errors of 10% or less of the transition time, ensuring that all series-connected devices share substantially the same fraction of their cumulative off state voltage. The turn off time is particularly critical for the OFF transition of series-connected devices, as too early a transition of any device device transition OFF early due to a slightly higher threshold voltage, it will be subjected to a larger share of the voltage causing it to experience higher power dissipation. As that device heats up due to higher power dissipation, its threshold voltage will fall, keeping the device ON longer, thus providing improved synchronicity with devices with which it is connected in series.

The power processors 200$a$-200$c$, the topology of FIG. 11 and FIG. 12 having isolation and power factor correction in each of the phases may provide superior power factor correction performance when compared to prior art approaches, e.g. in which the outputs of isolated first stages are combined to feed a single regulating second stage. The topology of FIGS. 11 and 12 may also overcome issues with reverse energy flow among multiple fixed-K isolation stages that are configured to deliver power to a common output. The topology of FIGS. 11 and 12 may be preferable to that of FIGS. 2 and 10 for the ability to reduce the regulating PFC stage to a single stage or cell as shown in FIG. 12 compared to the multiple stacked cells of FIG. 10.0

Figure 13:
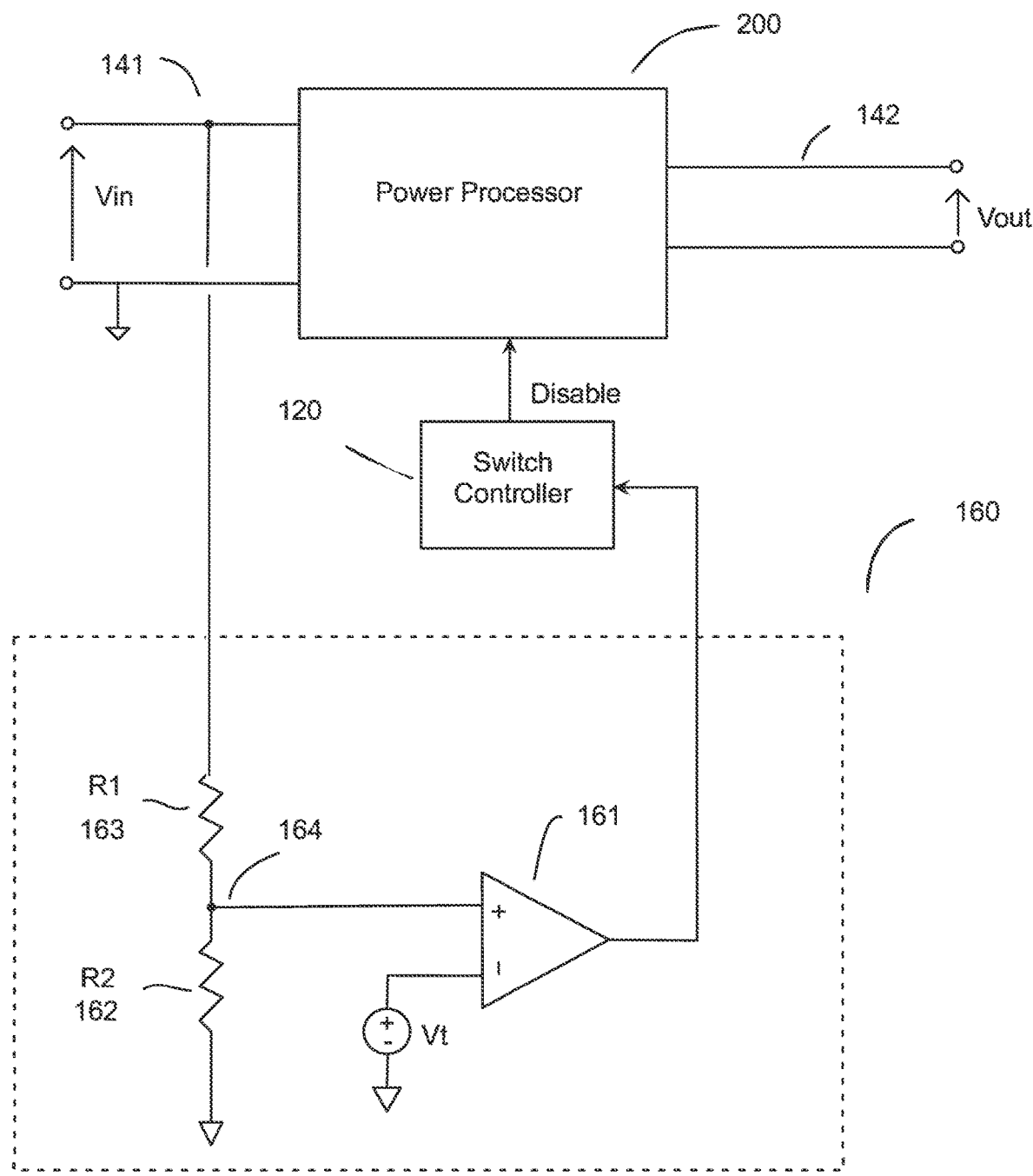
FIG. 13 shows an embodiment of a transient detection controller.

Referring to FIG. 13, active transient suppression may be implemented in the power processors of FIGS. 1, 2, 9 and 11 with the addition of an active transient switch controller, which may preferably be incorporated into the first stage switch controller, e.g. the switch controller shown in FIG. 4 for the regulator-first topology of FIG. 2 or in FIG. 6 for the isolation-first topology of FIG. 11, or may be implemented separately, e.g. as shown in FIG. 13 controller 120 and threshold detector 160. As shown schematically in FIG. 13, the transient voltage detector 160 may be configured to detect input voltage transient conditions, e.g. input voltages exceeding a predetermined threshold voltage, Vt, and responsively send a signal to the switch controller, e.g. controller 120, which may disable the power train switches. The power train switches in one or both stages of each affected power processor may be turned off in response to the switch disable signal, effectively disconnecting that power processor during the detected transient condition. In the configuration of FIG. 11, the power train switches in the isolated first power converters, e.g. isolated first stage converters 704a-704c, may be disabled on the occurrence of an overvoltage condition on its respective AC source phase. In the example of FIG. 12, primary switches S1-1, S2-1, S1-2, S2-2, S1-3, S2-3 and the controlled rectifier switches may be disabled to effectively isolate the second stage from the voltage perturbation. The second stage regulators may optionally remain functional because of the isolation provided by the disabled first stage or may also be disabled. In the configuration of FIG. 2, preferably the power train switches in the first and second stages, e.g. first stage 304a and second stage 306a, may be disabled in the event of a voltage transient exceeding the operating range of the power processor since the non-isolated stage precedes the isolation stage. While the power train switches are disabled, the power processor will not process any power, however, power may continue to be delivered to the load 60 from bulk energy storage element 300. While disabled the power processor may safely ride out voltages far exceeding its normal operating range, avoid damage, and prevent perturbation at the output, while avoiding the size, reliability, and cost disadvantages of other transient suppression techniques. Although the active transient suppression may be implemented in either the regulation-first topology (FIG. 2) or the isolation-first topology (FIG. 11), the latter may be more advantageous because for equal figure of merit switches, the isolation stage provides twice the transient voltage protection of the regulation stage.

Figure 9:
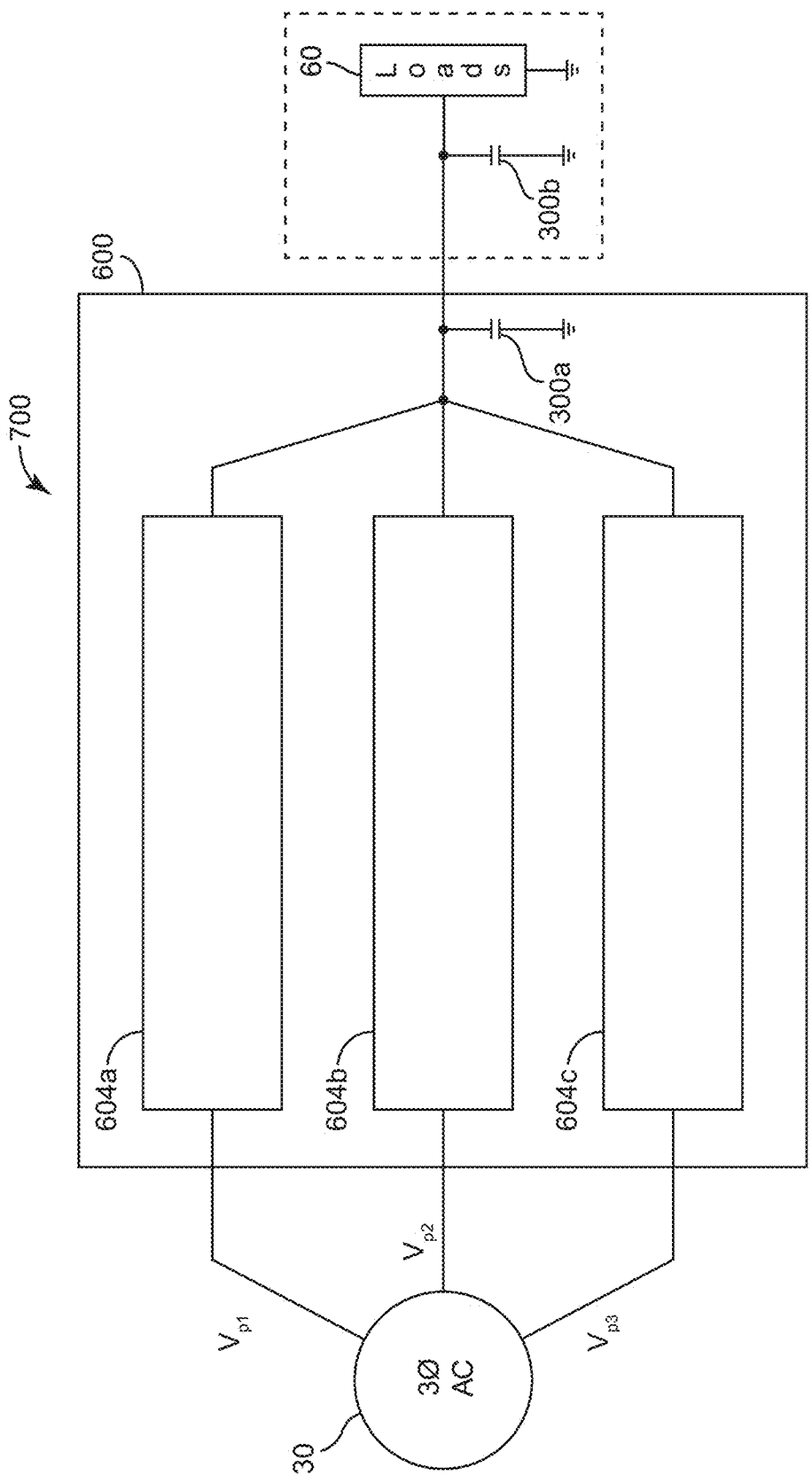
FIG. 9 shows distribution of bulk storage in a three-phase AC to DC PFC power system according to an illustrative embodiment.

Bulk energy storage and filtering (e.g., capacitor 300, FIG. 2) may be distributed in location depending on system configuration. For example, FIG. 9 shows a power system according to the invention 700 in which part of the bulk energy storage 300a is located close to the combined output of the power processors 604a, 604b, 604c, and part of the bulk energy storage 300b is located close to the load 60. In some embodiments, power processors 604a, 604b, and 604c may include the same or similar components as described above with respect to various embodiments (e.g., power converters 200a, 200b, and 200c).

For the purposes of the present disclosure, values may be considered "equal," "substantially the same," "substantially equal," "essentially equal," etc. when the values are exactly equal to or nearly equal to one another.

A number of embodiments of the invention have been described. Nevertheless, it will be understood that various modifications may be made without departing from the spirit and scope of the invention. For example, one or more filters may be incorporated for reducing noise and/or for transient suppression.

What is claimed is:

1. An apparatus for converting power received from a source for delivery to a load, the apparatus comprising:
a two-stage power processor having a processor input adapted to receive power at a processor input voltage, V1-in, from the source and a processor output for delivering power to the load, the two-stage power processor including a first switching power conversion stage and a second switching power conversion stage;
the first switching power conversion stage including a plurality of input cells connected to receive power from the processor input and a plurality of outputs connected to deliver power to the second switching power conversion stage, each input cell having a respective input for receiving power at an input voltage, Vin, and each input cell having a respective one or more power switches and a respective primary winding connected to convert power received from the respective input for delivery to a respective output via a secondary winding magnetically coupled in common with each of the primary windings to form a multi-winding transformer; and
a switch controller constructed and arranged to operate the first switching power conversion stage in a series of converter operating cycles with an essentially fixed voltage transformation ratio, K=V1out/V1in;
the plurality of input cells including a number, n, of input cells,
the inputs of the n, input cells being connected in series across the processor input to divide the processor input voltage, V1-in, among the input cells such that Vin=V1-in/n;
the second switching power conversion stage comprising a plurality of switching regulators, each having a respective regulator input connected to receive power from a respective first stage output, a respective second stage output connected to deliver power to a system output, and a respective one or more power switches;
the second switching power conversion stage comprising one or more switch controllers constructed and arranged to operate the one or more power switches to regulate the second stage output;
wherein the outputs of the switching regulators are connected in parallel with each other to deliver power to the load.

2. The apparatus of claim 1 wherein the one or more power switches include primary switches in each of the plurality of input cells that include a maximum voltage rating, Vdevmax, that is 80 volts or lower.

3. The apparatus of claim 1, wherein the one or more power switches include primary switches in each of the plurality of input cells that include a maximum voltage rating, Vdevmax, that is 100 volts or lower.

4. The apparatus of claim 1, wherein the one or more power switches include primary switches in each of the plurality of input cells that include a maximum voltage rating, Vdevmax, that is 120 volts or lower.

5. The apparatus of claim 1, wherein the one or more power switches include primary switches in each of the plurality of input cells that include a maximum voltage rating, Vdevmax, that is 60 volts or lower.

6. The apparatus of claim 1 wherein the number, n, of input cells is 3 and each of the plurality of input cells includes primary switches of the one or more power switches that experience a maximum stress that is Vin/3 or lower, where Vin is the processor input voltage.

7. The apparatus of claim 6 wherein each of the primary switches experiences a maximum stress that is Vin/6 or lower, where Vin is the processor input voltage.

8. The apparatus of claim 1 wherein the number, n, of input cells is 3 and an output voltage V1out of each cell is Vin/6 or lower, where Vin is the processor input voltage.

9. The apparatus of claim 1 wherein the number, n, of input cells is 3 and a first stage output voltage, V1out is equal to Vin/6 or lower, where Vin is the processor input voltage.

10. The apparatus of claim 1 wherein the number, n, of input cells is 4 and each of the plurality of input cells includes primary switches of the one or more power switches that experience a maximum stress that is Vin/4 or lower, where Vin is the processor input voltage.

11. The apparatus of claim 10 wherein each of the primary switches experiences a maximum stress that is Vin/8 or lower.

12. The apparatus of claim 1 wherein the number, n, of input cells is 4 and an output voltage V1out of each cell is Vin/8 or lower, where Vin is the processor input voltage.

13. The apparatus of claim 1 wherein the number, n, of input cells is 4 and a first stage output voltage, V1out is equal to Vin/8 or lower, where Vin is the processor input voltage.

14. The apparatus of claim 1 further comprising a bulk storage device connected to the outputs of the plurality of switching regulators.

15. The apparatus of claim 1, comprising:
one or more energy storage devices connected to a common output of the plurality of switching regulators;
wherein the outputs of the switching regulators are connected in parallel to deliver power to the common output to supply power to the load.

16. The apparatus of claim 1, comprising:
the first switching power conversion stage configured and arranged to convert power received from a first stage input via the multi-winding transformer, the first stage output being galvanically isolated from the first stage input,
the first switching power conversion stage including the one or more power switches comprising:
one or more primary power switches connected to drive the multi-winding transformer;
one or more secondary power switches connected to rectify power received from the multi-winding transformer,
the switch controller adapted to provide signals to turn the one or more primary power switches ON and OFF in a series of first converter operating cycles to convert power via the transformer at an essentially fixed ratio, K-Vin/Vout, from the first stage input for delivery at a unipolar voltage to the first stage output, the unipolar voltage characterized by a periodic ripple having a characteristic frequency and a characteristic period.

* * * * *